United States Patent
Yao et al.

(10) Patent No.: US 12,443,060 B2
(45) Date of Patent: Oct. 14, 2025

(54) OPTICAL WAVEGUIDE COMPONENT, PREPARATION METHOD THEREFOR, AND ELECTRO-OPTIC MODULATOR

(71) Applicant: HUAWEI TECHNOLOGIES CO., LTD., Guangdong (CN)

(72) Inventors: Zhanshi Yao, Shenzhen (CN); Xiang Yin, Shanghai (CN); Xiaolu Song, Shenzhen (CN); Mengdie Sun, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 18/314,241

(22) Filed: May 9, 2023

(65) Prior Publication Data
US 2023/0273468 A1 Aug. 31, 2023

Related U.S. Application Data

(63) Continuation of application No. PCT/CN2021/101101, filed on Jun. 18, 2021.

(30) Foreign Application Priority Data

Nov. 10, 2020 (CN) .......................... 202011246781.4

(51) Int. Cl.
*G02F 1/035* (2006.01)
*G02B 6/12* (2006.01)

(52) U.S. Cl.
CPC ...... *G02F 1/035* (2013.01); *G02B 2006/1204* (2013.01); *G02B 2006/12097* (2013.01)

(58) Field of Classification Search
CPC ............................ G02F 1/035; G02F 1/0356
See application file for complete search history.

(56) References Cited

U.S. PATENT DOCUMENTS

2007/0297720 A1* 12/2007 Sugiyama ............ G02B 6/1223
385/32
2010/0310206 A1* 12/2010 Kawano ................ G02F 1/0356
385/2
(Continued)

FOREIGN PATENT DOCUMENTS

| CN | 105278125 A | 1/2016 |
|---|---|---|
| CN | 110989214 A | 4/2020 |
| JP | 2012-78375 A * | 4/2012 |

OTHER PUBLICATIONS

Cheng Wang et al:"Integrated lithium niobate electro-optic modulators operating at CMOS-compatible voltages", Nature vol. 562, 101-104 (2018), Oct. 4, 2018, total 12 pages.

(Continued)

*Primary Examiner* — Michael Stahl

(57) ABSTRACT

An optical waveguide component, a preparation method therefor, and an electro-optic modulator are disclosed. The optical waveguide component includes an insulating substrate, a waveguide core, at least two electrodes, and a cladding layer. The at least two electrodes and the waveguide core are all disposed on the insulating substrate, the at least two electrodes are distributed on two sides of the waveguide core, and the cladding layer covers at least a part of an outer wall of the waveguide core. The waveguide core includes an electro-optic material having an electro-optic effect. A refractive index of the insulating substrate is less than a refractive index of the waveguide core. A refractive index of the cladding layer is greater than the refractive index of the waveguide core.

20 Claims, 16 Drawing Sheets

(56) References Cited

U.S. PATENT DOCUMENTS

| | | | | |
|---|---|---|---|---|
| 2011/0243493 A1* | 10/2011 | Kondou | .................. | G02B 6/126 |
| | | | | 385/11 |
| 2021/0208429 A1* | 7/2021 | Freude | ..................... | G02B 6/12 |
| 2022/0308371 A1* | 9/2022 | Liang | ...................... | G02F 1/365 |

OTHER PUBLICATIONS

Luca Alloatti et al:"100 GHz silicon organic hybrid modulator", Light: Science and Applications (2014) 3, e173; doi:10.1038/lsa.2014.54, May 23, 2014, total 4 pages.

A. Melikyan et al:"High-speed plasmonic phase modulators", Nature Photonics, 8(3), 229-233 (2014), Feb. 16, 2014, total 5 pages.

International Search Report dated Aug. 30, 2021, issued for International Application No. PCT/CN2021/101101 (12 pages).

Extended European Search Report dated Mar. 11, 2024, issued for European Application No. 21890627.9 (6 pages).

\* cited by examiner

OPTICAL WAVEGUIDE COMPONENT, PREPARATION METHOD THEREFOR, AND ELECTRO-OPTIC MODULATOR

CROSS-REFERENCE TO RELATED APPLICATIONS

This application is a continuation of International Application No. PCT/CN2021/101101, filed on Jun. 18, 2021, which claims priority to Chinese Patent Application No. 202011246781.4, filed on Nov. 10, 2020. The disclosures of the aforementioned applications are hereby incorporated by reference in their entireties.

TECHNICAL FIELD

This disclosure relates to the field of optical communication technologies, and in particular, to an optical waveguide component, a preparation method therefor, and an electro-optic modulator.

BACKGROUND

A thin-film lithium niobate (TFLN for short) modulator is a linear electro-optic effect-based integrated optical waveguide component that attracts widespread attention at present.

In a TFLN modulator, an LN layer forms a ridge TFLN waveguide by using a photolithography technique. Thanks to a refractive index difference between LN and silicon dioxide, an optical field can be propagated in the TFLN through total internal reflection. Metal electrodes are disposed on two sides of the TFLN waveguide, and are used to apply a voltage to generate a transverse electric field in a waveguide region. According to linear electro-optic effect of the LN, when the electric field is applied, the applied electric field causes an obvious refractive index change of an LN material, significantly changes an effective refractive index of an optical mode, and further directly affects a phase of an optical signal in the waveguide.

To further improve efficiency of conversion from an electrical signal to an optical signal, a distance between the metal electrodes needs to be shortened, to generate higher electric field intensity at the waveguide under a same voltage condition, thereby improving overlapping efficiency of the electric field and the optical field. However, metal has significant light absorption effect. If the distance between the metal electrodes is excessively short, large space overlapping exists between the metal electrodes and an optical mode field, which obviously increases a loss of the optical signal and increases an insertion loss of the modulator. Limited to a low refractive index of the LN material, the TFLN waveguide has weak limiting effect on the optical field, and an area of a formed optical waveguide mode field is large. Therefore, to avoid causing the loss of the optical signal, the metal electrodes of this structure need to be disposed at positions that are far away from the TFLN waveguide, and the distance between the metal electrodes is large. Therefore, this structure limits to further improve overlapping efficiency of the electric field and the optical field. To generate an enough large phase change of the optical signal, a modulation area needs to be designed to be long, and this also limits modulation bandwidth.

SUMMARY

Embodiments of this disclosure provide an optical waveguide component that can enhance an optical field limitation, a preparation method therefor, and an electro-optic modulator.

According to a first aspect, this disclosure provides an optical waveguide component, including an insulating substrate, a waveguide core, at least two electrodes, and a cladding layer. The at least two electrodes and the waveguide core are all disposed on the insulating substrate, the at least two electrodes are distributed on two sides of the waveguide core, and the cladding layer covers at least a part of an outer wall of the waveguide core. The waveguide core includes an electro-optic material having electro-optic effect. A refractive index of the insulating substrate is less than a refractive index of the waveguide core, and a refractive index of the cladding layer is greater than the refractive index of the waveguide core. Alternatively, the optical waveguide component further includes an additional layer disposed between the cladding layer and the waveguide core, and the refractive index of the cladding layer is greater than a refractive index of the additional layer.

If efficiency of conversion from an electrical signal to an optical signal needs to be improved, a distance between electrodes needs to be shortened, to generate higher electric field intensity at a waveguide under a same voltage condition, thereby improving overlapping efficiency of an electric field and an optical field. However, because the electrodes have strong light absorption effect, when the distance between the electrodes is too short, a large optical loss may be caused.

However, in this disclosure, the at least a part of the outer wall of the waveguide core is coated with the cladding layer, and the cladding layer and the waveguide core form a hybrid waveguide, so that a capability for limiting the optical field in the waveguide core is enhanced, a distribution range of an optical evanescent field outside the waveguide core is reduced, and the spacing between the electrodes is effectively shortened, thereby reducing the optical loss, and improving modulation efficiency. Because high modulation efficiency can achieve a phase change of an optical signal required for modulation by using a shorter modulation area length, modulation bandwidth is increased. Compared with an optical waveguide component provided with no cladding layer, in a case of a same optical loss, a spacing between electrodes can be effectively shortened, so that the electrodes can be closer to a waveguide core. Therefore, overlapping efficiency of an electric field and an optical field is improved, and modulation efficiency is improved. Compared with the optical waveguide component provided with no cladding layer, in a case of a same electrode spacing, the optical waveguide component provided in this disclosure has a lower optical loss.

The cladding layer may be a silicon layer. Because a refractive index of the silicon layer is significantly higher than the refractive index of the waveguide core, the cladding layer can enhance the capability for limiting the optical field in the waveguide core. Another benefit of using the silicon layer is that a waveguide cross section can better meet a speed matching condition between an optical frequency band and a microwave frequency band by properly designing a structure size, thereby improving a high-bandwidth response of the component. The additional layer may be further disposed between the cladding layer and the waveguide core. The refractive index of the cladding layer is greater than the refractive index of the additional layer, so that the capability of the cladding layer for limiting the optical field in the waveguide core can be enhanced, and an optical loss during optical transmission of the optical waveguide component can be further reduced.

The electro-optic effect means that, under an action of the electric field, if intensity or a direction of the electric field changes, a refractive index of the electro-optic material also changes accordingly. The electro-optic effect material includes an electro-optic effect material having linear electro-optic effect. The linear electro-optic effect refers to effect that a change of the refractive index of the electro-optic material is proportional to intensity of an applied electric field under the action of the electric field. The electro-optic material having the linear electro-optic effect includes materials such as lithium niobate, barium titanate, lead zirconate titanate (PZT for short), and electro-optic polymers. It may be understood that the electro-optic material is not limited to the linear electro-optic effect material.

According to the first aspect, in a first possible implementation of the first aspect of this disclosure, the waveguide core includes a first side wall, a top wall, and a second side wall that are connected, the top wall is disposed opposite to the insulating substrate, the first side wall and the second side wall are both located between the top wall and the insulating substrate, and the cladding layer covers at least one of the first side wall, the top wall, and the second side wall, to enhance the capability for limiting the optical field in the waveguide.

According to the first aspect or the first possible implementation of the first aspect, in a second possible implementation of the first aspect of this disclosure, there is at least one cladding layer, there is at least one additional layer, and the cladding layer and the additional layer are alternately disposed. Therefore, the range of the optical evanescent field can be effectively shortened, to enhance the capability for limiting the optical field in the waveguide.

According to the first aspect or the first and the second possible implementations of the first aspect, in a third possible implementation of the first aspect of this disclosure, the optical waveguide component further includes a waveguide plate layer, the waveguide plate layer is laid on the insulating substrate, the waveguide core and the at least two electrodes are convexly disposed on the waveguide plate layer, and the waveguide core and the waveguide plate layer jointly form a ridge waveguide, to reduce an etching depth of the waveguide, thereby reducing overlapping between the optical field and a side wall of the waveguide and reducing the optical loss.

According to the first aspect or the first to the third possible implementations of the first aspect, in a fourth possible implementation of the first aspect of this disclosure, a part that is of the waveguide plate layer and that is close to the waveguide core is covered by the cladding layer, to reduce a requirement for alignment precision during cladding layer preparation.

According to the first aspect or the first to the fourth possible implementations of the first aspect, in a fifth possible implementation of the first aspect of this disclosure, the optical waveguide component further includes at least two conductive transition units, the at least two conductive transition units are distributed on the two sides of the waveguide core, each conductive transition unit is sandwiched between one electrode and the waveguide plate layer, and a minimum spacing between the conductive transition unit and the waveguide core is less than a minimum spacing between the electrode and the waveguide core. Compared with the electrode, the conductive transition unit is closer to the waveguide core. In this way, the conductive transition unit can share a voltage applied by using the electrodes to two conductive transition units, thereby improving overlapping efficiency of the electric field and the optical field at the waveguide core, and improving a modulation capability of the electro-optic modulator.

According to the first aspect or the first to the fifth possible implementations of the first aspect, in a sixth possible implementation of the first aspect of this disclosure, the optical waveguide component further includes at least two insulation units, the at least two insulation units are distributed on the two sides of the waveguide core, and each insulation unit is sandwiched between the waveguide plate layer and one electrode. The insulation unit is configured to isolate the electrode from the waveguide plate layer, thereby improving reliability of the optical waveguide component.

According to the first aspect or the first to the sixth possible implementations of the first aspect, in a seventh possible implementation of the first aspect of this disclosure, the optical waveguide component further includes at least two insulation units, the at least two insulation units are distributed on the two sides of the waveguide core, and each insulation unit is sandwiched between the waveguide plate layer and one electrode. The insulation unit is configured to isolate the electrode from the waveguide plate layer, thereby improving reliability of the optical waveguide component.

According to the first aspect or the first to the seventh possible implementations of the first aspect, in an eighth possible implementation of the first aspect of this disclosure, the optical waveguide component further includes at least two conductive transition units, the at least two conductive transition units are distributed on the two sides of the waveguide core, each conductive transition unit is sandwiched between one electrode and the insulating substrate, and a minimum spacing between the conductive transition unit and the waveguide core is less than a minimum spacing between the electrode and the waveguide core. Compared with the electrode, the conductive transition unit is closer to the waveguide core. In this way, the conductive transition unit can share a voltage applied by using the electrodes to two conductive transition units, thereby improving overlapping efficiency of the electric field and the optical field at the waveguide core, and improving a modulation capability of the electro-optic modulator.

According to the first aspect or the first to the eighth possible implementations of the first aspect, in a ninth possible implementation of the first aspect of this disclosure, the optical waveguide component further includes a carrier, a side that is of the insulating substrate and that faces away from the waveguide core is attached to the carrier, and the carrier is configured to support the insulating substrate, the waveguide core, and the like.

According to the first aspect or the first to the ninth possible implementations of the first aspect, in a tenth possible implementation of the first aspect of this disclosure, the optical waveguide component further includes an insulation coverage layer, the insulation coverage layer covers the cladding layer and/or the additional layer, and a refractive index of the insulation coverage layer is less than the refractive index of the cladding layer and the refractive index of the waveguide core, to reduce the distribution range of the optical evanescent field.

According to a second aspect, this disclosure provides a preparation method for an optical waveguide component, including: providing a prefabricated structure, where the prefabricated structure includes an insulating substrate and a prefabricated layer, the prefabricated layer includes an electro-optic material having electro-optic effect, and a refractive index of the insulating substrate is less than a refractive index of the prefabricated layer; etching the prefabricated layer to form a waveguide core; forming a cladding layer or a coating structure on at least a part of an outer wall of the waveguide core, where when the cladding layer is formed on the at least a part of the outer wall of the waveguide core, a refractive index of the cladding layer is greater than a refractive index of the waveguide core, or when the coating structure is formed on the at least a part of the outer wall of the waveguide core, the coating structure includes the cladding layer and an additional layer, the additional layer is disposed between the cladding layer and the waveguide core, and the refractive index of the cladding layer is greater than a refractive index of the additional layer; and forming at least two electrodes, where the at least two electrodes are distributed on two sides of the waveguide core.

According to the second aspect, in a first possible implementation of the second aspect of this disclosure, there is at least one cladding layer, there is at least one additional layer, and the additional layer and the cladding layer are alternately disposed.

According to the second aspect or the first possible implementation of the second aspect, in a second possible implementation of the second aspect of this disclosure, the etching the prefabricated layer to form a waveguide core further includes: etching the prefabricated layer to further form a waveguide plate layer, the waveguide core is convexly disposed on the waveguide plate layer, and the waveguide core and the waveguide plate layer jointly form a ridge waveguide.

According to the second aspect or the first and the second possible implementations of the second aspect, in a third possible implementation of the second aspect of this disclosure, before the forming at least two electrodes, the preparation method further includes: depositing and forming at least two conductive transition units on a side that is of the waveguide plate layer and that faces away from the insulating substrate, the at least two conductive transition units are distributed on the two sides of the waveguide core, and each conductive transition unit is sandwiched between one electrode and the waveguide plate layer.

According to the second aspect or the first to the third possible implementations of the second aspect, in a fourth possible implementation of the second aspect of this disclosure, before the depositing and forming at least two conductive transition units on a side that is of the waveguide plate layer and that faces away from the insulating substrate, the preparation method further includes: depositing and forming at least two insulation units on the side that is of the waveguide plate layer and that faces away from the insulating substrate; and the depositing and forming at least two conductive transition units on a side that is of the waveguide plate layer and that faces away from the insulating substrate includes: depositing and forming the conductive transition unit on each insulation unit, and each insulation unit is sandwiched between one conductive transition unit and the waveguide plate layer, and a minimum spacing between the conductive transition unit and the waveguide core is less than a minimum spacing between the electrode and the waveguide core.

According to the second aspect or the first to the fourth possible implementations of the second aspect, in a fifth possible implementation of the second aspect of this disclosure, before the forming at least two electrodes, the preparation method further includes: depositing and forming at least two insulation units on a side that is of the waveguide plate layer and that faces away from the insulating substrate, the at least two insulation units are distributed on the two sides of the waveguide core, and each insulation unit is sandwiched between the waveguide plate layer and one electrode.

According to the second aspect or the first to the fifth possible implementations of the second aspect, in a sixth possible implementation of the second aspect of this disclosure, before the forming at least two electrodes, the preparation method further includes: depositing and forming at least two conductive transition units on a side of the insulating substrate, the at least two conductive transition units are distributed on the two sides of the waveguide core, each conductive transition unit is sandwiched between one electrode and the insulating substrate, and a minimum spacing between the conductive transition unit and the waveguide core is less than a minimum spacing between the electrode and the waveguide core.

According to the second aspect or the first to the sixth possible implementations of the second aspect, in a seventh possible implementation of the second aspect of this disclosure, after the forming the at least two electrodes, the preparation method further includes: depositing an insulation coverage layer, the insulation coverage layer covers the cladding layer and/or the additional layer, and a refractive index of the insulation coverage layer is less than the refractive index of the cladding layer and the refractive index of the waveguide core.

According to a third aspect, this disclosure provides an electro-optic modulator, including an optical input port, an optical output port, and the at least one optical waveguide component. The optical input port is configured to input an optical signal, at least two electrodes of the optical waveguide component are configured to generate an electric field to change a refractive index of a waveguide core, to modulate a phase of an optical signal incident to the waveguide core, and the optical output port is configured to output an optical signal obtained by the optical waveguide component through modulation.

According to the third aspect, in a first possible implementation of the third aspect of this disclosure, the electro-optic modulator further includes at least one interferometer, the interferometer includes a beam splitter, at least one phase shifter, and a beam combiner, at least one of the at least one phase shifter is the optical waveguide component, an optical signal that is input through the optical input port enters the beam splitter, an optical signal that is obtained by the beam splitter through beam splitting enters the phase shifter, an optical signal that is obtained by the phase shifter through phase modulation enters the beam combiner, and an optical signal that is obtained by the beam combiner through beam combination is output through the optical output port.

According to the third aspect or the first possible implementation of the third aspect, in a second possible implementation of the third aspect of this disclosure, the electro-optic modulator further includes at least one coupler and a microring resonant cavity, the microring resonant cavity includes the optical waveguide component, at least a part of an optical signal that is incident through the optical input port is coupled to the microring resonant cavity by using the at least one coupler, and an optical signal that is obtained by the microring resonant cavity through phase modulation is coupled to the optical output port by using the at least one coupler for output.

According to the third aspect or the first and the second possible implementations of the third aspect, in a third possible implementation of the third aspect of this disclosure, the electro-optic modulator is an FP resonant cavity modulator, the electro-optic modulator further includes a first partial reflection mirror, a phase shifter, and a second partial reflection mirror, the phase shifter includes the optical waveguide component, an optical signal that is incident through the optical input port is incident to the phase shifter by using the first partial reflection mirror and is then incident to the second partial reflection mirror after phase modulation by the phase shifter, a part of the optical signal that is incident to the second partial reflection mirror is output through the optical output port and the other part of the optical signal that is incident to the second partial reflection mirror is reflected to the first partial reflection mirror, and the first partial reflection mirror and the second partial reflection mirror form a resonant cavity, so that the optical signal can be propagated back and forth between the first partial reflection mirror and the second partial reflection mirror.

DESCRIPTION OF EMBODIMENTS

To make the objectives, technical solutions, and advantages of this disclosure clearer, the following further describes this disclosure in detail with reference to the accompanying drawings.

It should be understood that expressions such as "include" and "may include" that may be used in this disclosure indicate existence of the disclosed function, operation, or constituent element, and do not limit one or more additional functions, operations, and constituent elements. In this disclosure, terms such as "include" and/or "have" may be construed as a particular characteristic, quantity, operation, constituent element, or component, or a combination thereof, but cannot be construed as excluding the existence or possible addition of one or more other characteristics, quantities, operations, constituent elements, or components, or combinations thereof.

In addition, in this disclosure, the expression "and/or" includes any and all combinations of words listed in association. For example, the expression "A and/or B" may include A, may include B, or may include both A and B.

In this disclosure, expressions including ordinal numbers such as "first" and "second" may modify elements. However, such elements are not limited by the expressions. For example, the expressions do not limit the order and/or importance of the elements. The expression is used only to distinguish one element from another. For example, first user equipment and second user equipment indicate different user equipment, although both the first user equipment and the second user equipment are user equipment. Similarly, without departing from the scope of this disclosure, a first element may be referred to as a second element, and similarly, a second element may also be referred to as a first element.

When a component "connects" or "is connected" to another component, it should be understood that the component directly connects or is directly connected to the another component, or a further component may alternatively exist between the component and the another component. In addition, when a component "directly connects" or "directly connected" to another component, it should be understood that there is no component between them.

Figure 1:
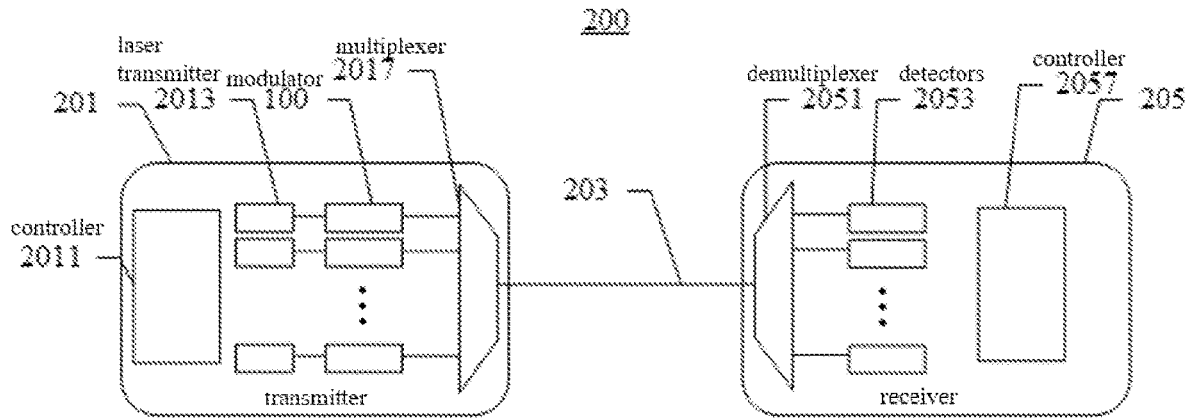
FIG. 1 is a block diagram of a structure of an optical communication system according to a first implementation of this disclosure.

Refer to FIG. 1. A first implementation of this disclosure provides an optical communication system 200, including a transmitter 201, a transmission medium 203, and a receiver 205. The transmitter 201 is configured to convert an electrical signal into an optical signal for output, and the transmission medium 203 is configured to propagate the optical signal output by the transmitter 201. The transmission medium 203 is usually an optical waveguide that can perform optical transmission, such as an optical fiber. The receiver 205 is configured to receive the optical signal output by the transmitter 201 and convert the optical signal into an electrical signal.

The transmitter 201 includes a transmit controller 2011, a laser transmitter 2013, an electro-optic modulator 100, and a wavelength division multiplexer 2017. In this implementation, there are a plurality of laser transmitters 2013, there are a plurality of electro-optic modulators 100, and each electro-optic modulator 100 corresponds to one laser transmitter 2013. The laser transmitter 2013 is configured to input light of a preset wavelength to a corresponding electro-optic modulator 100 under control of the transmit controller 2011. The electro-optic modulator 100 is driven by the transmit controller 2011, and changes, based on the input electrical signal, a feature of the light input to the electro-optic modulator 100, such as a phase or intensity, to implement conversion from the electrical signal to an optical signal. The wavelength division multiplexer 2017 is configured to combine optical signals of different wavelengths together and output a combined optical signal to the transmission medium 203 through a same port. In this implementation, the transmit controller 2011 is an electrical chip provided with an integrated circuit. It may be understood that there may be one laser transmitter 2013 and one electro-optic modulator 100.

The receiver 205 includes a wavelength division demultiplexer 2051, an optical detector 2053, and a receiving controller 2057. In this implementation, there are a plurality of optical detectors 2053. The wavelength division demultiplexer 2051 is configured to isolate the optical signals of different wavelengths that are input to the same port through the transmission medium 203 and output the optical signals to different optical detectors 2053. The optical detector 2053 is configured to convert the optical signal into an electrical signal and transmit the electrical signal to the receiving controller 2057. The receiving controller 2057 is an electrical chip provided with an integrated circuit. It may be understood that there may be one optical detector 2053.

The electro-optic modulator is a component in the transmitter that is responsible for converting the electrical signal into the optical signal, is one of core components in the optical communication system, and is also a main factor that affects bandwidth of the optical communication system. If efficiency and bandwidth of a conversion process of the electro-optic modulator are improved, performance of the entire optical communication system is greatly improved. A TFLN modulator is an electro-optic modulator that attracts widespread attention at present. The TFLN modulator generates a transverse electric field in a waveguide region by using metal electrodes to apply a voltage, so as to change a refractive index of an LN waveguide, to modulate a phase of an optical signal transmitted in the LN waveguide. To improve efficiency of conversion from the electrical signal to the optical signal, a distance between the metal electrodes is usually reduced to enhance the electric field. However, the metal electrodes have strong light absorption effect. If the distance between the metal electrodes is excessively short, large space overlapping exists between the metal electrodes and an optical mode field, which increases a loss of the optical signal. However, an LN material has a low refractive index, so that a capability for limiting an optical field is weak and an area of a formed optical waveguide mode field is large, thereby causing a large optical loss.

Figure 2:
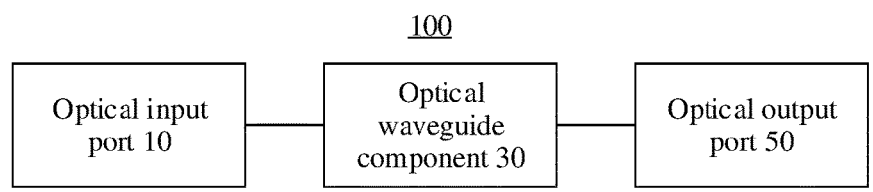
FIG. 2 is a block diagram of a structure of an electro-optic modulator according to a first implementation of this disclosure.

In view of this, refer to FIG. 2. The first implementation of this disclosure provides the electro-optic modulator 100, including an optical input port 10, an optical waveguide component 30, and an optical output port 50. The optical input port 10 is configured to input light output by the laser transmitter 2013. The optical waveguide component 30 is configured to modulate the input light under an action of the electric field. The optical output port 50 is configured to output an optical signal formed by the optical waveguide component 30 through modulation. Both the optical input port 10 and the optical output port 50 are optical waveguides that can perform optical conduction.

Figure 3:
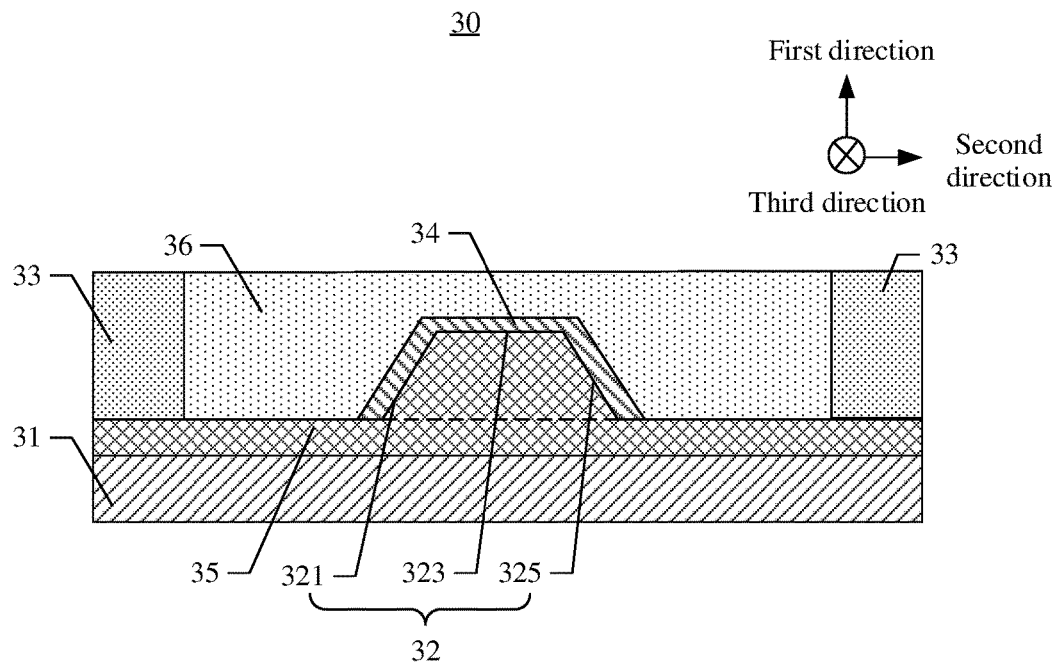
FIG. 3 is a sectional view of an optical waveguide component of an electro-optic modulator according to a first implementation of this disclosure.

Refer to FIG. 3. The optical waveguide component 30 includes an insulating substrate 31, a waveguide core 32, two electrodes 33, and a cladding layer 34. The two electrodes 33 and the waveguide core 32 are all disposed on the insulating substrate 31. The waveguide core 32 and the insulating substrate 31 are stacked, and are configured to transmit an optical signal input by the laser transmitter 2013. The two electrodes 33 are distributed on two sides of the waveguide core 32, and are used to apply a voltage to the waveguide core 32 to form an electric field to change a refractive index of the waveguide core 32, to modulate a phase of an optical signal transmitted in the waveguide core 32. In this implementation, a stacking direction of the waveguide core 32 and the insulating substrate 31 is a first direction, and the two electrodes 33 are distributed on the two sides of the waveguide core 32 in the second direction perpendicular to the first direction. The waveguide core 32 includes an electro-optic material having electro-optic effect, and a refractive index of the insulating substrate 31 is less than the refractive index of the waveguide core 32. When light is totally reflected at interfaces of two materials with different refractive indexes, an optical evanescent field is generated on a material with a lower refractive index, and an amplitude of the optical evanescent field is attenuated exponentially with a distance to the interface. The cladding layer 34 covers at least a part of an outer wall of the waveguide core 32, and the cladding layer 34 and the waveguide core 32 jointly form a hybrid waveguide, so that a capability for limiting an optical field in the waveguide core 32 is enhanced, a distribution range of the optical evanescent field outside the waveguide core 32 is reduced, and a spacing between the electrodes is effectively shortened, thereby reducing an optical loss, and improving modulation efficiency. Compared with an optical waveguide component provided with no cladding layer, in a case of a same optical loss, the electrodes 33 of the optical waveguide component 30 provided in this disclosure may be closer to the waveguide core 32, that is, the spacing between the electrodes can be effectively shortened. Therefore, overlapping efficiency of the electric field and the optical field can be effectively improved, thereby improving modulation efficiency. Compared with the optical waveguide component provided with no cladding layer, in a case of a same electrode spacing, the optical waveguide component 30 provided in this disclosure has a lower optical loss.

The electro-optic effect means that, under an action of the electric field, if intensity or a direction of the electric field changes, a refractive index of the electro-optic material also changes accordingly. The electro-optic material having electro-optic effect includes an electro-optic material having linear electro-optic effect. The linear electro-optic effect refers to effect that a change of the refractive index of the electro-optic material is proportional to intensity of an applied electric field under the action of the electric field. The electro-optic material having the linear electro-optic effect includes materials such as lithium niobate, barium titanate, lead zirconate titanate (PZT for short), and electro-optic polymers. When the electrodes 33 are driven by the transmit controller 2011 to apply an electric field in a transverse direction (in the second direction) to the waveguide core 32, due to the linear electro-optic effect of the electro-optic material, a refractive index of a material of the waveguide core 32 may change. The change may change a propagation feature of an optical signal in the waveguide core 32, for example, a phase of the optical signal. In this implementation, the material of the waveguide core 32 is lithium niobate (LN for short), and a Z axis of a lattice of the lithium niobate is parallel to a surface that is of the insulating substrate 31 and that is close to the waveguide core 32. A refractive index of the insulating substrate 31 is less than a refractive index of the waveguide core 32, and the optical signal is totally reflected on a boundary interface of the waveguide core 32 and the insulating substrate 31, to avoid leakage of the optical signal at the insulating substrate 31. A material of the insulating substrate 31 includes but is not limited to silicon dioxide.

It may be understood that there may be at least two electrodes 33, and the electrodes 33 are disposed on two transverse sides of the waveguide core 32 in the second direction. A material of the electrodes 33 may include metal, for example, gold, copper, or aluminum.

In this implementation, the cladding layer 34 is a silicon layer. Because a refractive index of the silicon layer is significantly higher than the refractive index of the waveguide core 32, the cladding layer 34 can enhance the capability for limiting the optical field in the waveguide, thereby increasing modulation efficiency and bandwidth of the electro-optic modulator 100. Another benefit of using the silicon layer by the cladding layer 34 is that a waveguide cross section can better meet a speed matching condition between an optical frequency band and a microwave frequency band by properly designing a structure size, thereby improving a high-bandwidth response of the component. It may be understood that the cladding layer 34 is not limited to the silicon layer, and may alternatively be made of another material, provided that the refractive index of the cladding layer 34 is greater than the refractive index of the waveguide core 32.

A thickness of the cladding layer 34 needs to be appropriate. If the cladding layer 34 is too thick, most optical fields may be limited in the cladding layer 34, so that optical field distribution in the waveguide core 32 is reduced, thereby reducing spatial overlapping efficiency of the optical field and the waveguide core 32, and further reducing modulation efficiency of the electro-optic modulator 100. If the cladding layer 34 is too thin, an area of the optical field may be excessively large, thereby causing an excessively large optical loss. In this implementation, the thickness of the cladding layer 34 is not greater than 150 nm, that is, the cladding layer 34 is of a micro-nano structure, so that most optical fields are limited inside the waveguide core 32. It may be understood that the thickness of the cladding layer 34 is not limited.

The optical waveguide component 30 further includes a waveguide plate layer 35, the waveguide plate layer 35 is laid on the insulating substrate 31, the waveguide core 32 and the at least two electrodes 33 are convexly disposed on the waveguide plate layer 35, and the waveguide core 32 and the waveguide plate layer 35 jointly form a ridge waveguide, to reduce an etching depth of the waveguide, thereby reducing overlapping between the optical field and a side wall of the waveguide and reducing the optical loss. The ridge waveguide and the cladding layer 34 jointly form a hybrid waveguide structure. In some cases, a part that is of the waveguide plate layer 35 and that is close to the waveguide core 32 is covered by the cladding layer 34, to reduce a requirement for alignment precision during preparation of the cladding layer 34. In this implementation, a thickness range of the waveguide plate layer 35 in the first direction is not greater than 1.0 µm. It may be understood that a thickness of the waveguide plate layer 35 is not limited.

The optical waveguide component 30 further includes an insulation coverage layer 36, and the insulation coverage layer 36 covers the cladding layer 34. The insulation coverage layer 36 is configured to reduce a distribution range of the optical evanescent field. A refractive index of the insulation coverage layer 36 is less than the refractive index of the cladding layer 34 and the refractive index of the waveguide core 32. A material of the insulation coverage layer 36 may include but is not limited to silicon dioxide and silicon nitride. It may be understood that the optical waveguide component 30 may omit the insulation coverage layer 36, and is in an environment such as air or vacuum.

The waveguide core 32 extends in a third direction, the third direction is perpendicular to the first direction, and the third direction is perpendicular to the second direction. That is, the waveguide core 32 extends in a vertical direction of a cross section shown in FIG. 3. The waveguide core 32 has a function of transmitting light, so that an optical signal is propagated in an extension direction of the waveguide core 32. A width range of the waveguide core 32 in the second direction is not greater than 2.0 µm. A thickness range of the waveguide core 32 in the first direction is not greater than 1.5 µm. It may be understood that a width and a thickness of the waveguide core 32 are not limited. The waveguide core 32 is not limited to extending in the third direction. For example, the waveguide core 32 may be of an annular structure. The first direction is not limited to being perpendicular to the second direction, the first direction is not limited to being perpendicular to the third direction, the third direction is not limited to being perpendicular to the second direction, the first direction is different from the second direction, the first direction is different from the third direction, and the third direction is different from the second direction.

In this implementation, the cross section of the waveguide core 32 is approximately trapezoidal, and the waveguide core 32 includes a first side wall 321, a top wall 323, and a second side wall 325 that are connected. The top wall 323 is disposed opposite to the insulating substrate 31, the first side wall 321 and the second side wall 325 are both located between the top wall 323 and the insulating substrate 31, and the cladding layer 34 covers the first side wall 321, the top wall 323, and the second side wall 325. It may be understood that a cross-section shape of the waveguide core 32 is not limited, for example, may be a square. The waveguide core 32 may present a rectangular or trapezoidal contour based on a specific process implementation, for example, a range of an included angle formed between a side wall (the first side wall 321 or the second side wall 325) of the waveguide core 32 and a surface that is of the insulating substrate 31 and that is close to the waveguide core 32 may be [30, 90] degrees.

Figure 4A:
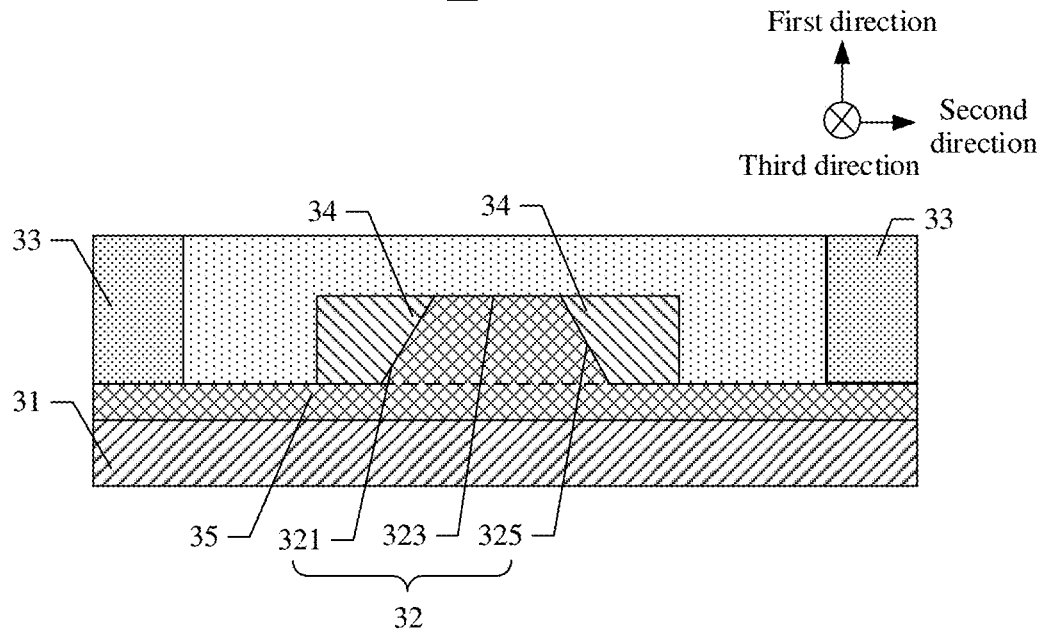
FIG. 4a and FIG. 4b are possible schematic diagrams of a structure of covering a waveguide core by a cladding layer of an optical waveguide component.
Figure 4B:
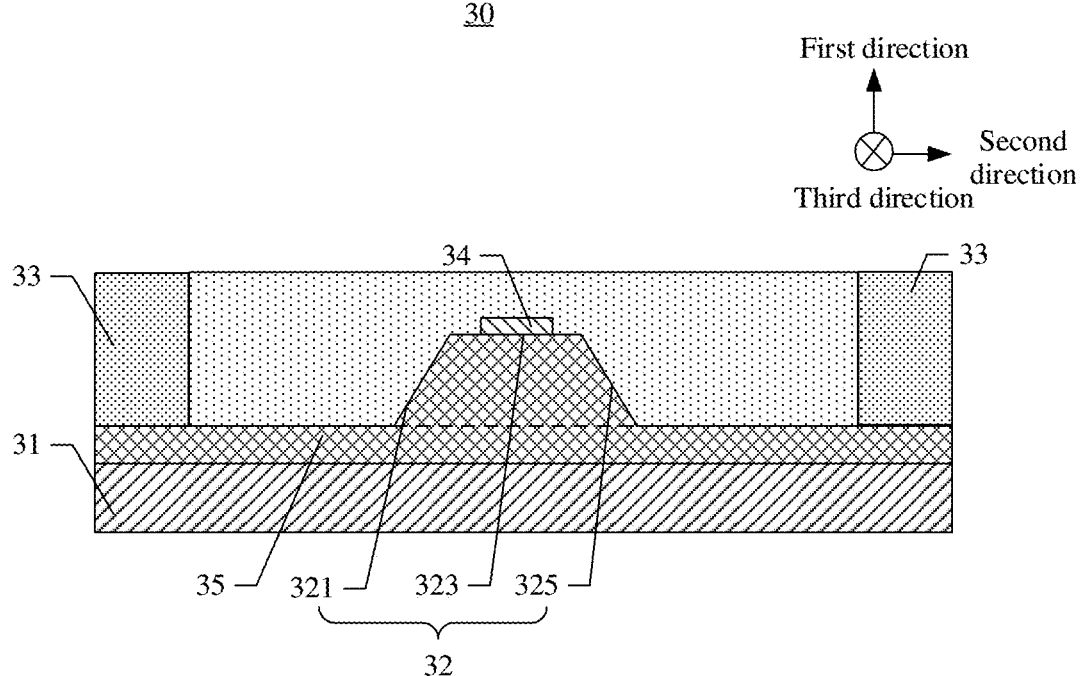

It may be understood that the cladding layer 34 may cover only a part of the waveguide core 32, and the cladding layer 34 may cover at least one of the first side wall 321, the top wall 323, and the second side wall 325. For example, refer to FIG. 4a. The cladding layer 34 covers the first side wall 321, the second side wall 325, and a part that is of the waveguide plate layer 35 and that is close to the waveguide core 32. The top wall 323 is not covered by the cladding layer 34. That is, in the second direction, the waveguide core 32 is sandwiched between two cladding layers 34, and the two cladding layers 34 form a cladding structure coating the waveguide core 32 in the second direction. The cladding structure can also have a function of enhancing the optical field limitation. In a first direction, a height of the cladding structure is approximately the same as a height of the waveguide core 32. In another implementation, the height of the cladding structure in the first direction is not limited. An included angle formed between the cladding layer 34 and the surface that is of the insulating substrate 31 and that is close to the waveguide core 32 may be equal to an included angle between the side wall (the first side wall 321 or the second side wall 325) of the waveguide core 32 and the surface that is of the insulating substrate 31 and that is close to the waveguide core 32. A range of the included angle formed between the cladding layer 34 and the surface that is of the insulating substrate 31 and that is close to the waveguide core 32 may be [30,90] degrees. In another implementation, the included angle formed between the cladding layer 34 and the surface that is of the insulating substrate 31 and that is close to the waveguide core 32 is not limited. A width of the cladding layer 34 in the second direction is at least 100 nm. In another implementation, the width of the cladding layer 34 in the second direction is not limited. For another example, refer to FIG. 4b. The cladding layer 34 covers a part of the top wall 323, and the cladding layer 34 does not cover the first side wall 323 and the second side wall 325. A material of the cladding layer 34 may further include at least one of titanium dioxide, silicon nitride, and the like.

It may be understood that the cladding layer 34 may also be in contact with the electrodes 33. In other words, the cladding layer 34 may cover a part of the electrodes 33. This is not limited herein.

Figure 5A:
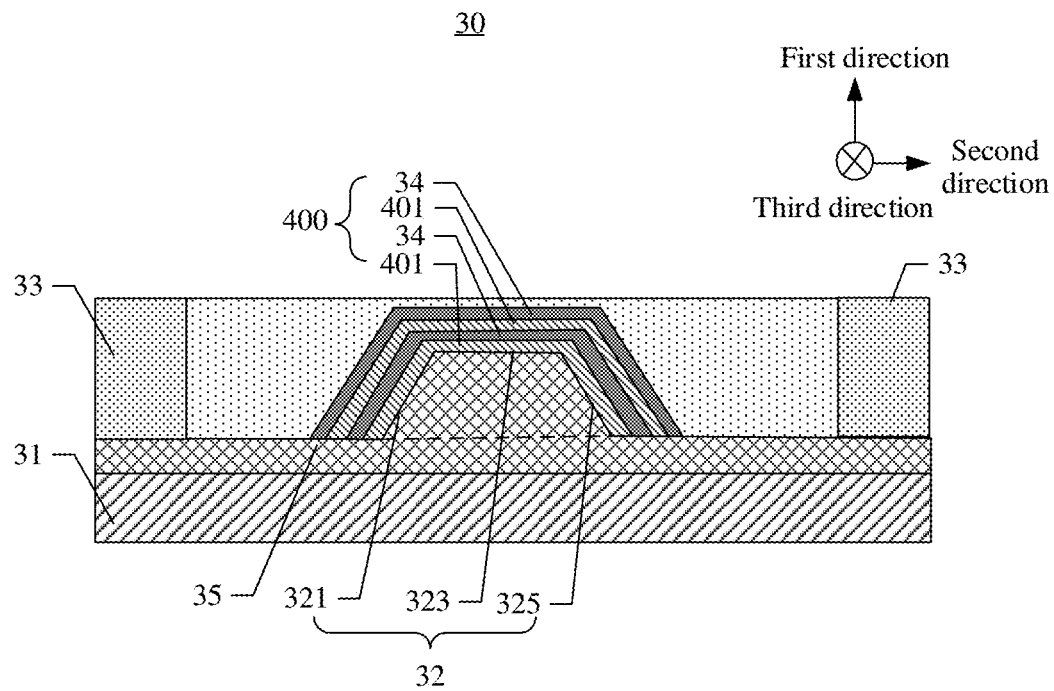
FIG. 5a and FIG. 5b are possible schematic diagrams of a structure of an optical waveguide component provided with a cladding layer and an additional layer.
Figure 5B:
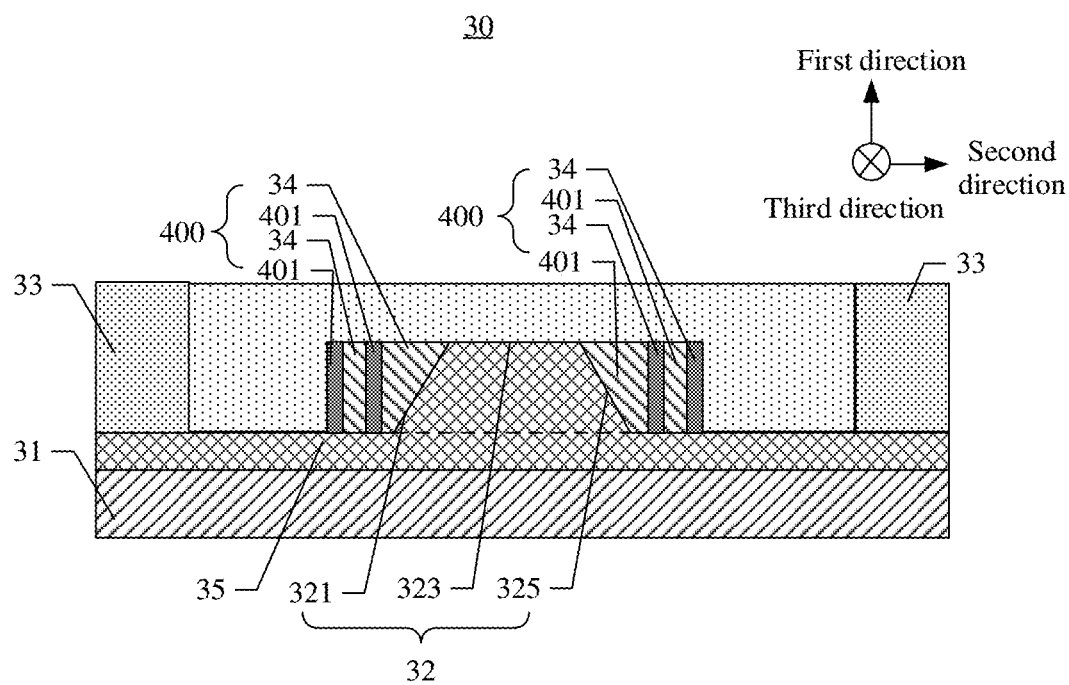

It may be understood that, refer to FIG. 5a and FIG. 5b. The optical waveguide component 30 further includes an additional layer 401 disposed between the cladding layer 34 and the waveguide core 32. The refractive index of the cladding layer 34 is greater than a refractive index of the additional layer 401. In other words, the cladding layer 34 and the additional layer 401 jointly form a coating structure 400, to enhance a capability of the cladding layer 34 for limiting an optical field in the waveguide core 32. More specifically, the cladding layer 34 and the additional layer 401 are alternately disposed, and the additional layer 401 is closest to the waveguide core 32, thereby enhancing the capability for limiting the optical field in the waveguide core 32. The cladding layer 34 and the additional layer 401 in FIG. 5a cover the first side wall 321, the top wall 323, and the second side wall 325 that are of the waveguide core 32. The cladding layer 34 and the additional layer 401 in FIG. 5b are distributed on the first side wall 321 and the second side wall 325 that are of the waveguide core 32. The cladding layer 34 and the additional layer 401 do not cover the top wall 323, that is, the coating structures 400 on two sides of the waveguide core 32 in FIG. 5b form a cladding structure. Materials for making the cladding layer 34 and the additional layer 401 include silicon, titanium dioxide, silicon nitride, and the like, provided that the refractive index of the cladding layer 34 is greater than the refractive index of the additional layer 401. A maximum thickness of one of the cladding layer 34 and the additional layer 401 may be 150 nm, so that a thickness of the overall coating structure 400 (the cladding layer 34 and the additional layer 401) is not too thick. Certainly, thicknesses of the cladding layer 34 and the additional layer 401 may not be limited. A quantity of cladding layers 34 is not limited, and a quantity and an arrangement manner of additional layers 401 are not limited. For example, there may be at least one cladding layer 34, and there may be at least one additional layer 401. The cladding layer 34 and the additional layer 401 are alternately disposed, to further enhance a capability for limiting the optical field of the coating structure. The thickness of the cladding layer 34 may be the same as or different from the thickness of the additional layer 401.

Figure 6A:
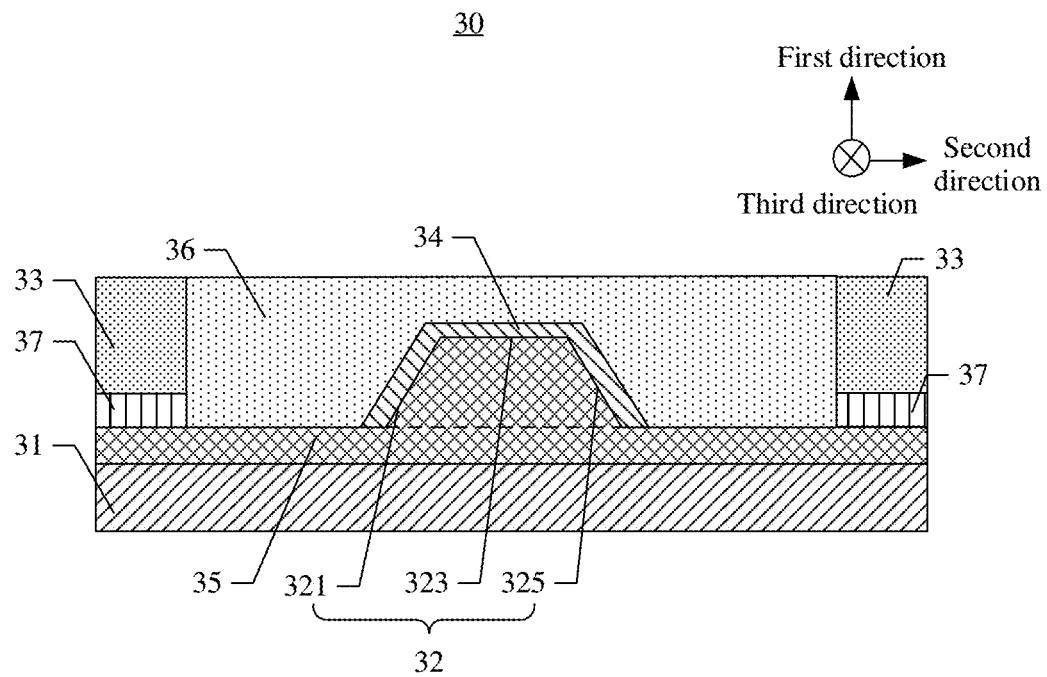
FIG. 6a to FIG. 6e are possible schematic diagrams of a structure of an optical waveguide component provided with an insulation unit.
Figure 6B:
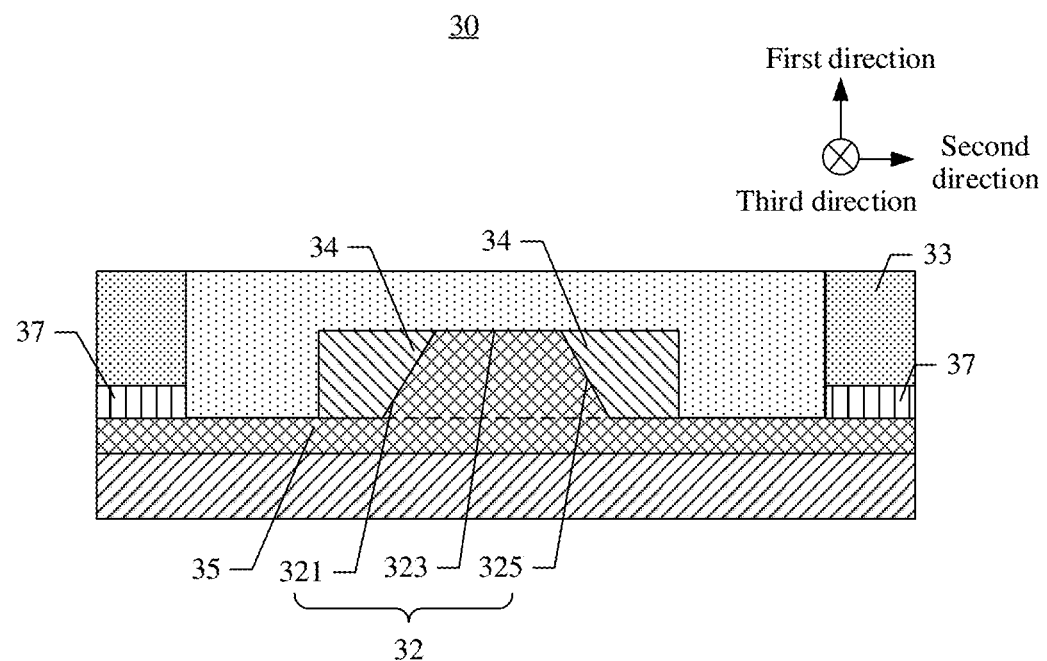
Figure 6C:
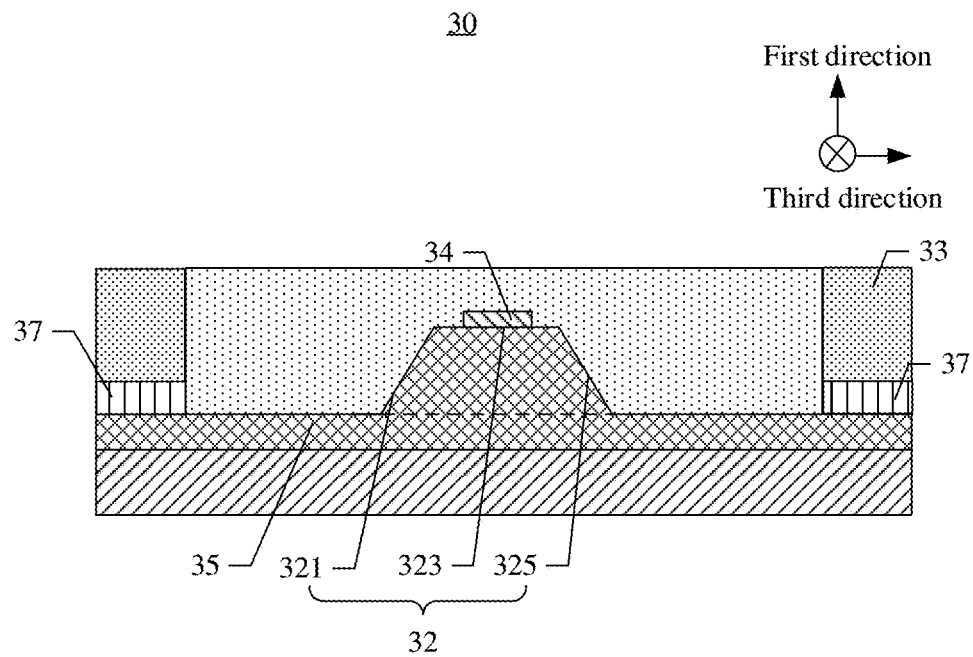
Figure 6D:
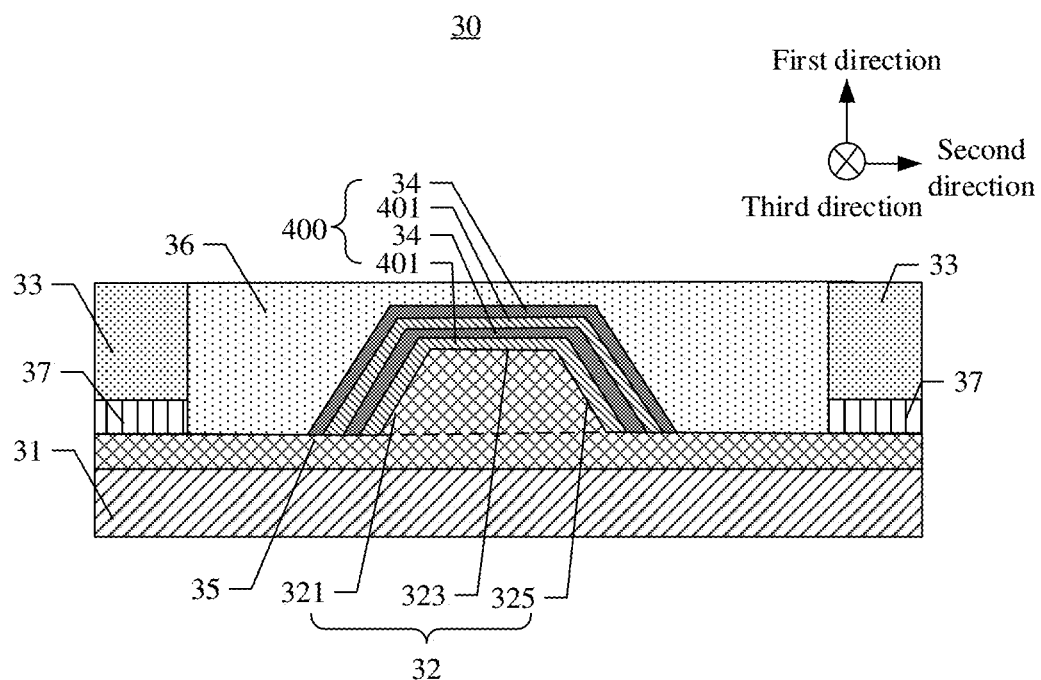
Figure 6E:
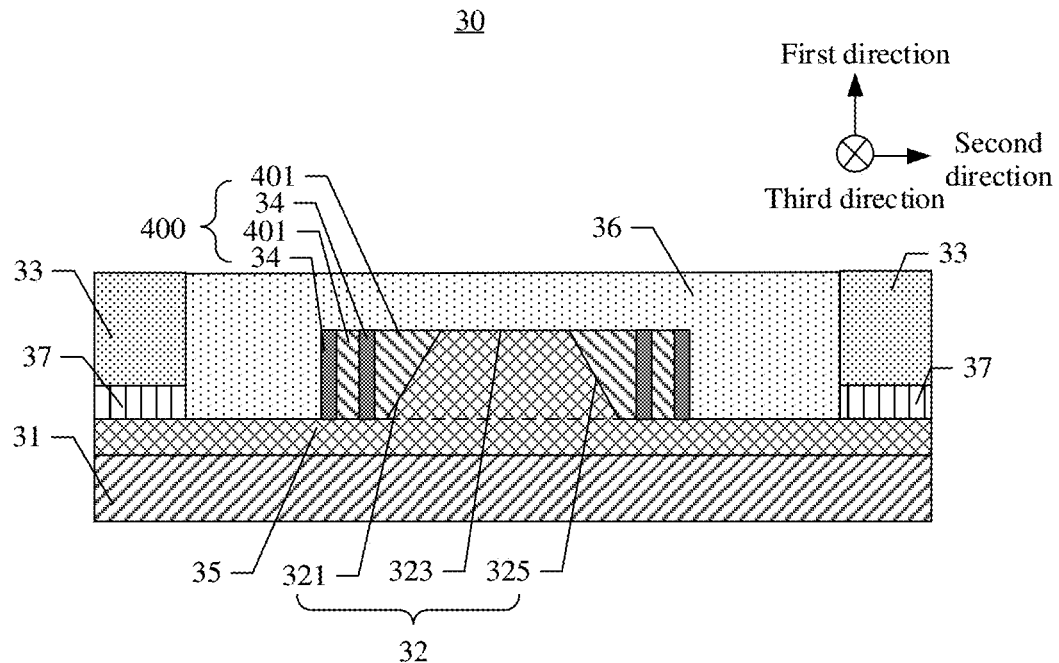

In some implementations, for example, refer to FIG. 6a to FIG. 6e. The optical waveguide component 30 further includes at least two insulation units 37. The at least two insulation units 37 are distributed on the two sides (for example, in the second direction) of the waveguide core 32, and each insulation unit 37 is sandwiched between the waveguide plate layer and one electrode 33. The insulation unit 37 is configured to electrically isolate the electrode 33 from the waveguide plate layer 35, to improve reliability of the electro-optic modulator 100. Generally, as use time increases, a substance in the waveguide plate layer 35 diffuses, and the insulation unit 37 can effectively reduce diffusion of the substance in the waveguide plate layer 35 to the electrodes 33, thereby improving stability of the optical waveguide component 30. The cladding layer 34 in FIG. 6a to FIG. 6c is a silicon cladding layer. In FIG. 6d and FIG. 6e, the optical waveguide component 30 further includes the additional layer 401, and the additional layer 401 is disposed between the cladding layer 34 and the waveguide core 32. More specifically, the additional layer 401 and the cladding layer 34 are alternately disposed, and the additional layer 401 and the cladding layer 34 jointly form the coating structure 400. A material of the insulation unit 37 includes silicon dioxide. It may be understood that the material of the insulation unit 37 is not limited to including the silicon dioxide, and the material of the insulation unit 37 may further include another insulating material, provided that the insulation unit 37 can electrically isolate the electrode 33 from the waveguide plate layer 35. In the optical waveguide component 30 shown in FIG. 6d and FIG. 6e, the optical waveguide component 30 further includes the additional layer 401. When the additional layer 401 is disposed between the cladding layer 34 and the waveguide core 32, a refractive index of the insulation coverage layer 36 is less than the refractive index of the cladding layer 34.

Figure 7:
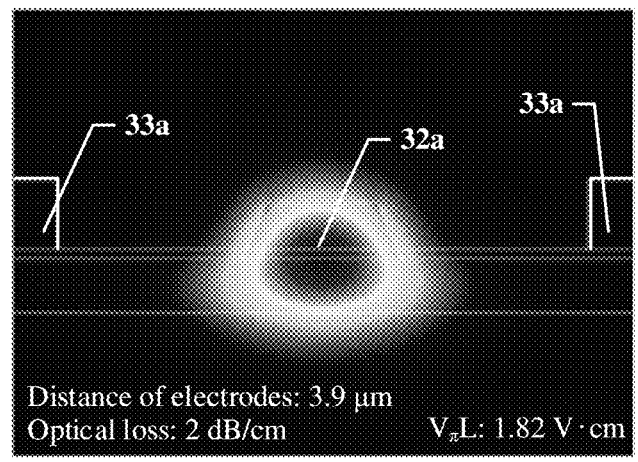
FIG. 7 is a schematic diagram of a result of simulation calculation performed on an optical waveguide component provided with no cladding layer based on a two-dimensional finite element analysis method.
Figure 8A:
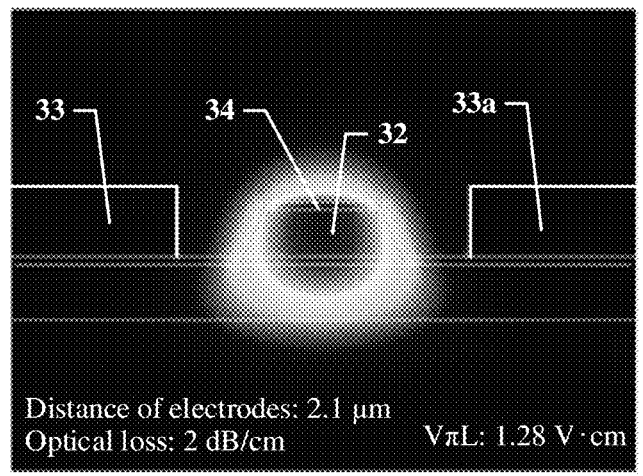
FIG. 8a is a schematic diagram of a result of simulation calculation performed on the optical waveguide component shown in FIG. 6a based on a two-dimensional finite element analysis method.
Figure 8B:
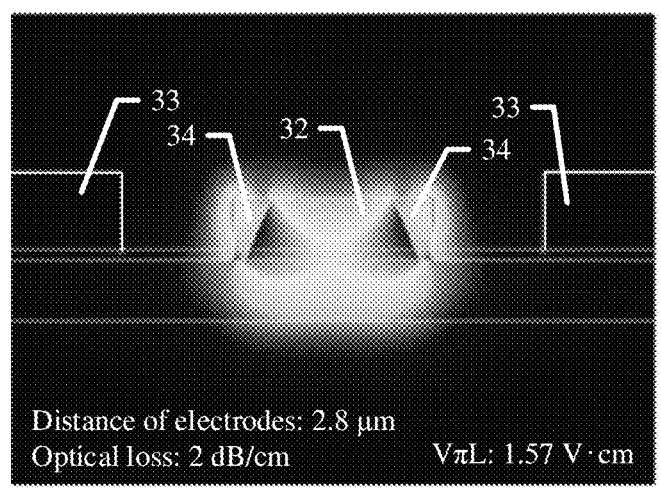
FIG. 8b is a schematic diagram of a result of simulation calculation performed on the optical waveguide component shown in FIG. 6b based on a two-dimensional finite element analysis method.

The following performs, based on a two-dimensional finite element analysis method (FEM), simulation calculation on the optical waveguide component provided with no cladding layer and the optical waveguide component 30 shown in FIG. 6a and FIG. 6b. Materials of the waveguide core and the waveguide plate layer of the optical waveguide component are both lithium niobate, the electrodes are both made of metal gold, and the insulating substrate and the insulation cover layer are both made of silicon dioxide. FIG. 7 is a diagram of a simulation result of the optical waveguide component provided with no cladding layer. When an optical loss allowed by the optical waveguide component is 2 dB/cm, two electrodes 33a are distributed on two sides of a waveguide core 32a, a spacing between the two electrodes 33a in the second direction is 3.9 μm, and a corresponding $V_xL$ value is 1.82 V·cm. FIG. 8a is a diagram of a simulation result of the optical waveguide component 30 provided with the cladding layer 34 shown in FIG. 6a based on the FEM. The cladding layer 34 is a 40 nm thick silicon cladding layer. When an optical loss allowed by the optical waveguide component is 2 dB/cm, a spacing between two electrodes 33 in the second direction is 2.1 and a corresponding $V_xL$ value is reduced to 1.28 V·cm. FIG. 8b is a schematic diagram of a result of simulation calculation performed on the optical waveguide component shown in FIG. 6b based on the FEM. The cladding layer 34 is a silicon cladding layer, the insulation coverage layer 36 is made of silicon dioxide, the electrodes 33 are made of metal gold, and the waveguide core 32 is made of LN. When an allowed optical loss is 2 dB/cm, a spacing between the two electrodes 33 in the second direction is 2.8 μm, and a corresponding $V_xL$ value is 1.57 V·cm. The $V_xL$ value is a product of a voltage $V_x$ applied by the two electrodes when an optical signal with a phase of 7C generated by the optical signal changes and a modulation area length L. The modulation area length L is a length of the waveguide core in the third direction. A smaller $V_xL$ value indicates higher modulation efficiency. Apparently, in the optical waveguide component 30 provided in this disclosure, because the cladding layer 34 structure is disposed on the outer wall of the waveguide core 32, the spacing between the two electrodes 33 in the optical waveguide component 30 can be effectively reduced, thereby improving modulation efficiency of the electro-optic modulator 100.

Figure 9A:
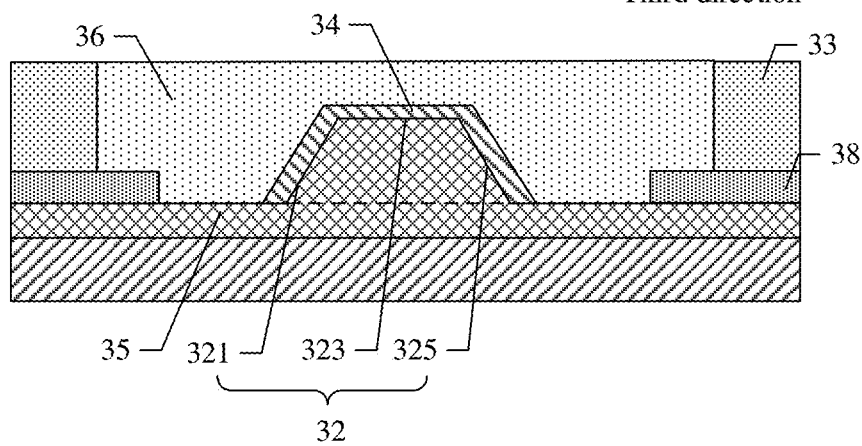
FIG. 9a to FIG. 9f are possible schematic diagrams of a structure of an optical waveguide component provided with a conductive transition unit.
Figure 9B:
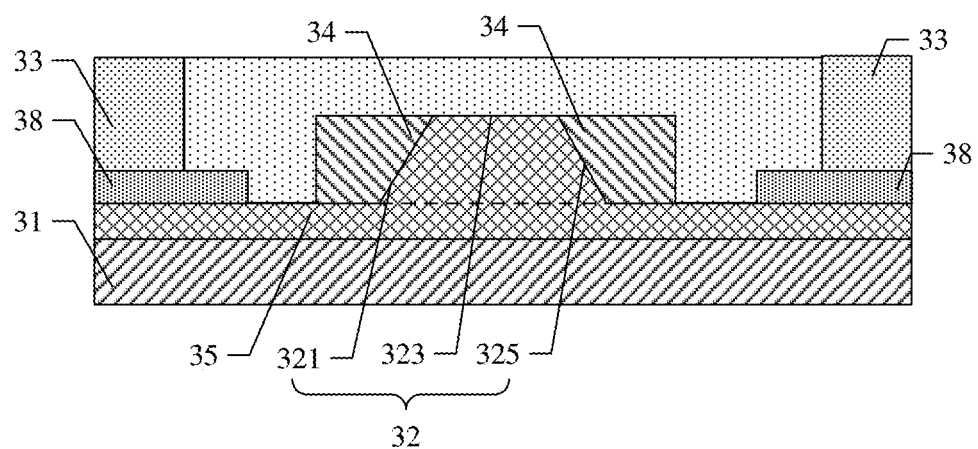
Figure 9C:
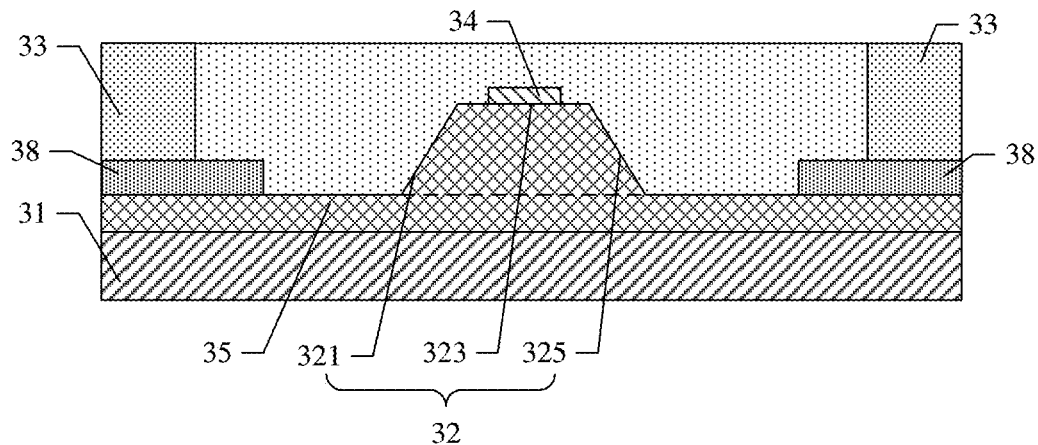
Figure 9D:
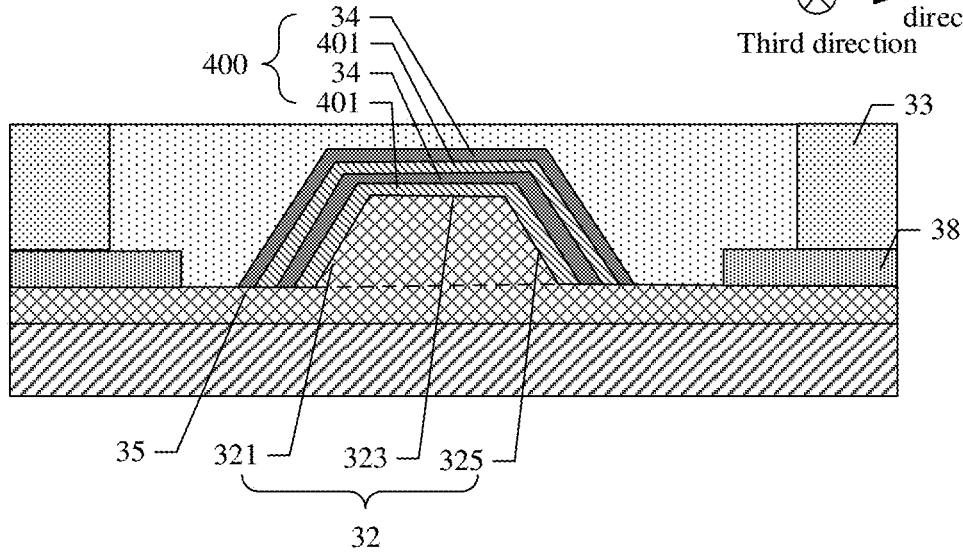
Figure 9E:
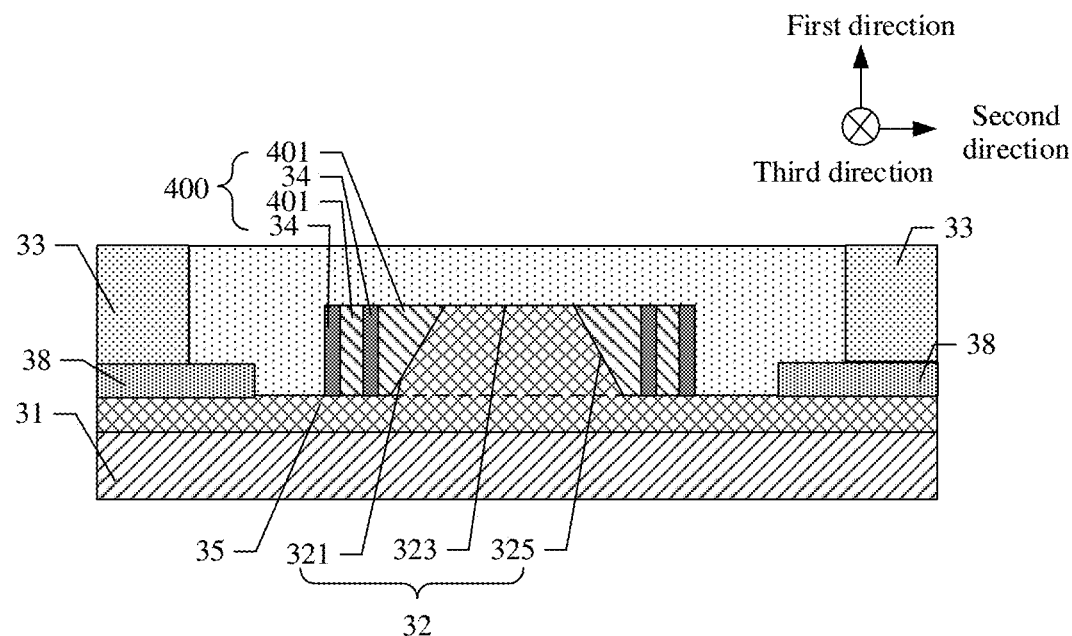
Figure 9F:
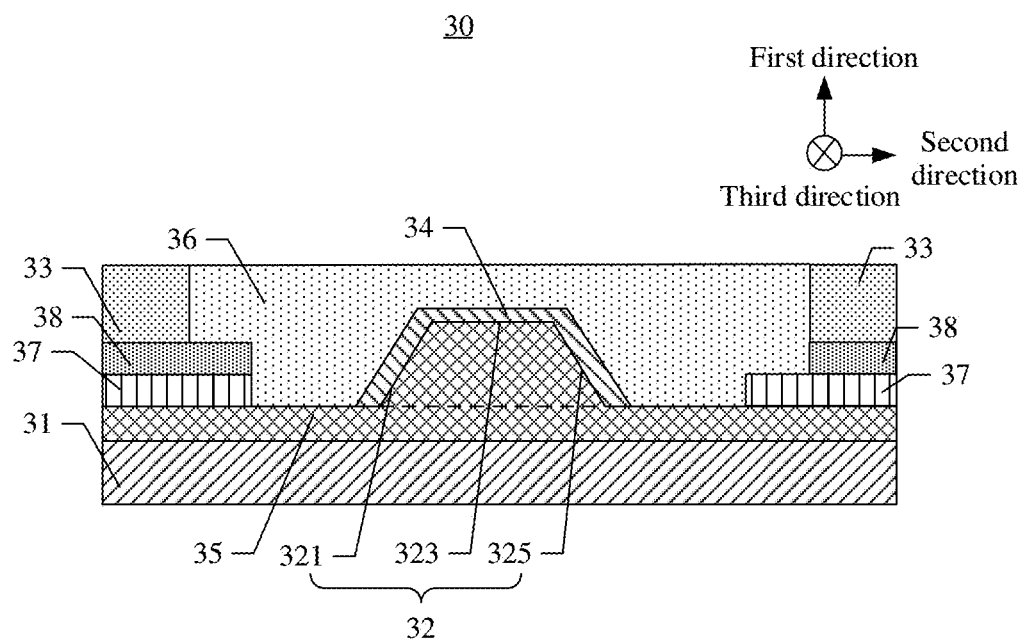

In some implementations, for example, refer to FIG. 9a to FIG. 9f. The optical waveguide component 30 further includes at least two conductive transition units 38. The at least two conductive transition units 38 are distributed on two sides (for example, in a second direction) of the waveguide core 32, and each conductive transition unit 38 is sandwiched between one electrode 33 and the waveguide plate layer 35. A minimum spacing between the conductive transition unit 38 and the waveguide core 32 is less than a minimum spacing between the electrode 33 and the waveguide core 32. In other words, the conductive transition unit 38 is closer to the waveguide core 32, to share the voltage applied by using the electrodes 33 to the two conductive transition units 38, thereby improving overlapping efficiency of the electric field and the optical field. The cladding layer 34 in FIG. 9a, FIG. 9b, FIG. 9c, and FIG. 9f is a silicon cladding layer. In FIG. 9d and FIG. 9e, the optical waveguide component 30 further includes the additional layer 401, and the additional layer 401 is disposed between the cladding layer 34 and the waveguide core 32. More specifically, the additional layer 401 and the cladding layer 34 are alternately disposed, and the additional layer 401 and the cladding layer 34 jointly form the coating structure 400. The optical waveguide component in FIG. 9f further includes at least two insulation units 37. The at least two insulation units 37 are distributed on the two sides (in the second direction) of the waveguide core 32. Each insulation unit 37 is sandwiched between the waveguide plate layer 35 and one conductive transition unit 38, and is configured to isolate the electrode 33 from the waveguide plate layer 35, thereby improving reliability of the optical waveguide component 30. The conductive transition unit 38 in FIG. 9a to FIG. 9f can share most of the voltage applied by using the electrodes 33 to the conductive transition units 38. Compared with the electrodes 33, the conductive transition unit 38 is closer to the waveguide core 32, and does not cause a high optical loss. Compared with a case in which the conductive transition unit 38 is not provided, in this case, after the conductive transition unit 38 is added, a stronger electric field may be applied to the waveguide core 32 under a same voltage condition, to provide more efficient overlapping efficiency between the electric field and the optical field, thereby increasing modulation efficiency of the electro-optic modulator. A material of the conductive transition unit 38 may include a material having a low optical loss and high conductivity, for example, a transparent conductive oxide (TCO) or doped silicon. The conductive transition element 38 may be isolated from the cladding layer 34 by the material of the insulation coverage layer 36, or may be in direct contact with the cladding layer 34.

Figure 10:
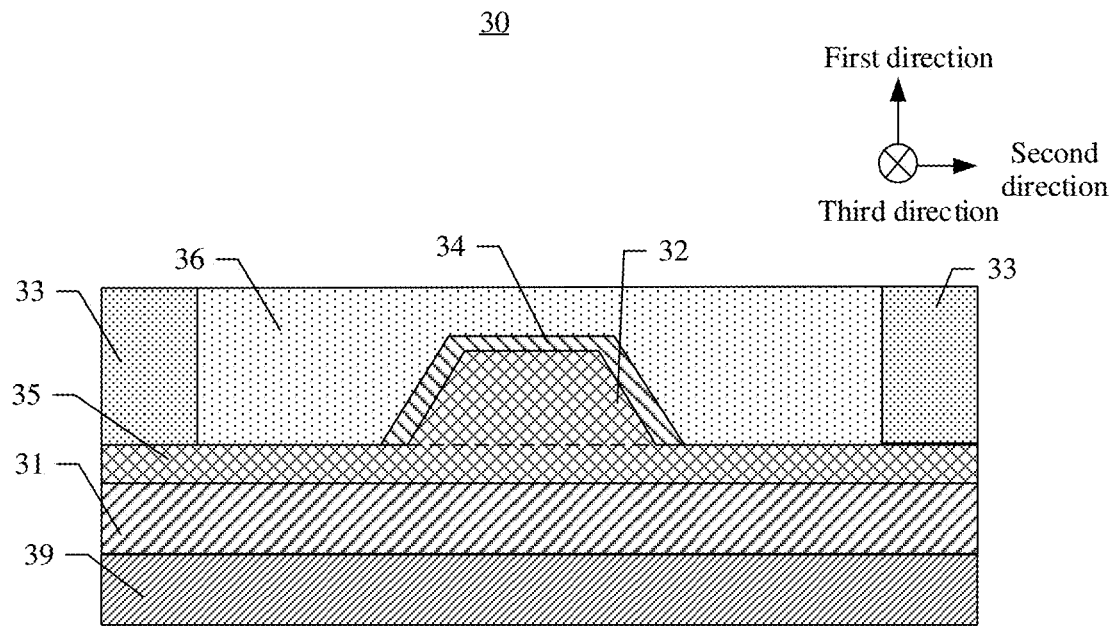
FIG. 10 is a possible schematic diagram of a structure of an optical waveguide component provided with a carrier.

In some implementations, refer to FIG. 10. The optical waveguide component 30 further includes a carrier 39. A side that is of the insulating substrate 31 and that faces away from the waveguide core 32 is attached to the carrier 39, and the carrier 39 is configured to support the insulating substrate 31, the waveguide core 32, the electrodes 33, the insulation coverage layer 36, and the like.

Figure 11:
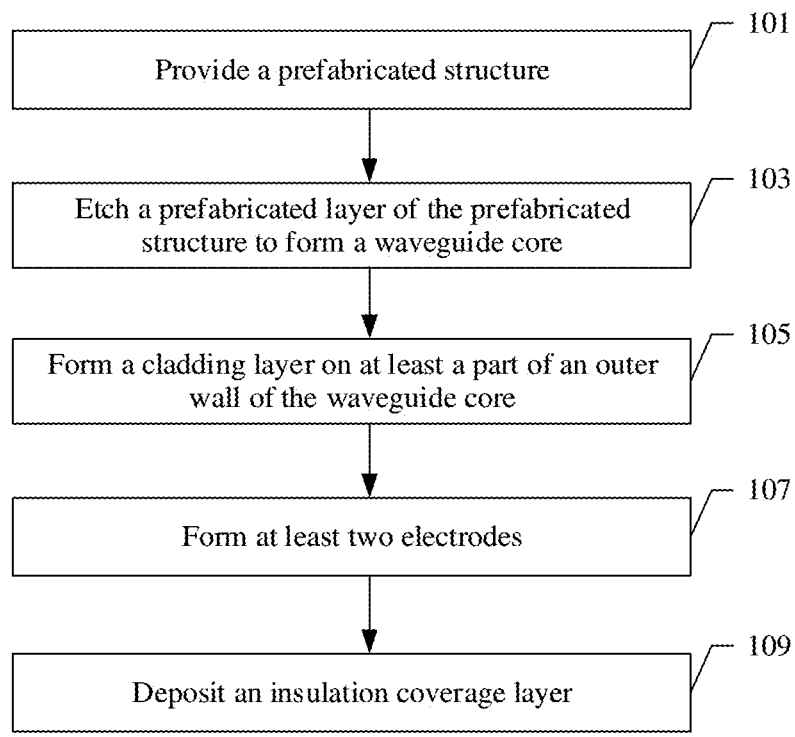
FIG. 11 is a flowchart of a preparation method for an optical waveguide component.
Figure 12A:
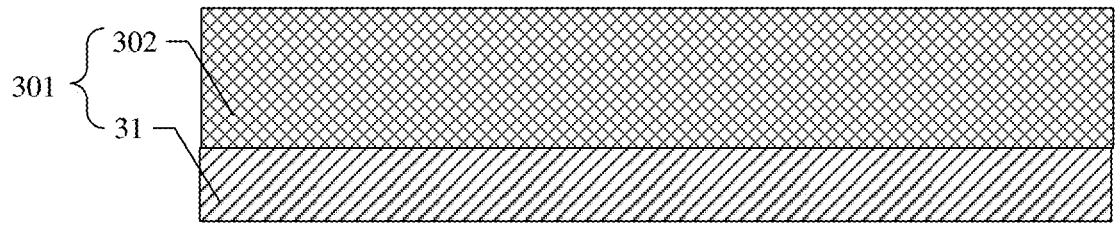
FIG. 12a is a schematic diagram of a structure obtained in step 101 in FIG. 11.

Refer to FIG. 11. The first implementation of this disclosure further provides a preparation method for the foregoing optical waveguide component, including the following steps:

Step 101: Provide a prefabricated structure, where the prefabricated structure includes an insulating substrate and a prefabricated layer that are stacked. Refer to FIG. 12a. A prefabricated structure 301 includes an insulating substrate 31 and a prefabricated layer 302 that are stacked, the prefabricated layer 302 is made of an electro-optic material having electro-optic effect, and a refractive index of the insulating substrate 31 is less than a refractive index of the prefabricated layer 302. The electro-optic effect means that, under an action of an electric field, if intensity or a direction of the electric field changes, a refractive index of the electro-optic material also changes accordingly. The electro-optic effect material includes an electro-optic effect material having linear electro-optic effect. The linear electro-optic effect refers to effect that a change of the refractive index of the electro-optic material is proportional to intensity of an applied electric field under the action of the electric field. The electro-optic material having the linear electro-optic effect includes materials such as lithium niobate, barium titanate, lead zirconate titanate (PZT for short), and electro-optic polymers.

Step 103: Etch the prefabricated layer of the prefabricated structure to form a waveguide core.

Step 105: Form a cladding layer on at least a part of an outer wall of the waveguide core.

Figure 12B:
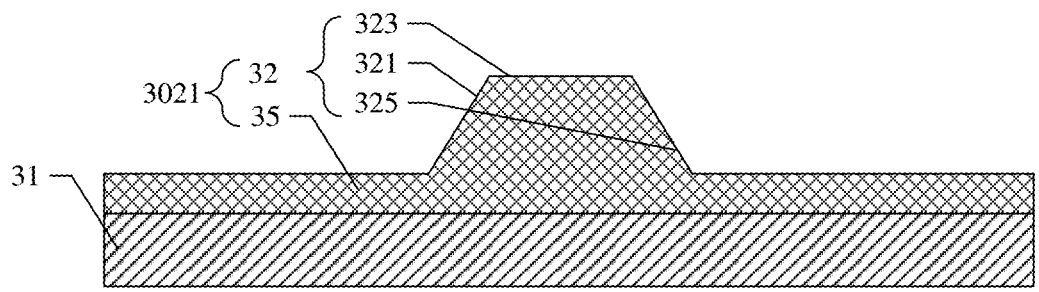
FIG. 12b is a schematic diagram of a structure obtained in step 103 in FIG. 11.

In this implementation, refer to FIG. 12b. In step 103, the prefabricated layer 302 is etched to form a ridge waveguide 3021, and the ridge waveguide 3021 includes a waveguide plate layer 35 and a waveguide core 32. The waveguide core 32 includes a first side wall 321, a top wall 323, and a second side wall 325 that are connected. The top wall 323 is disposed opposite to the insulating substrate 31, and both the first side wall 321 and the second side wall 325 are located between the top wall 323 and the insulating substrate 31. A range of an included angle formed between a side wall (the first side wall 321 or the second side wall 325) of the waveguide core 32 and a surface that is of the insulating substrate 31 and that is close to the waveguide core 32 may be [30, 90] degrees, so that the waveguide core 32 presents a rectangular or trapezoidal contour. The etching may use an etching technology such as photoetching.

Figure 12C:
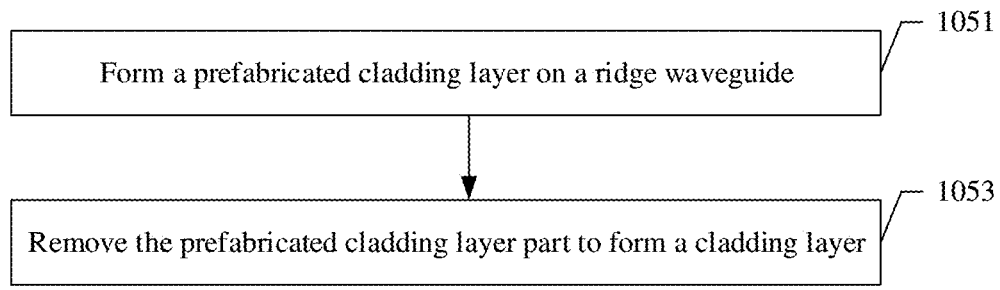
FIG. 12c is a flowchart of step 105 in FIG. 11.

Refer to FIG. 12c. Step 105 specifically includes the following steps.

Figure 12D:
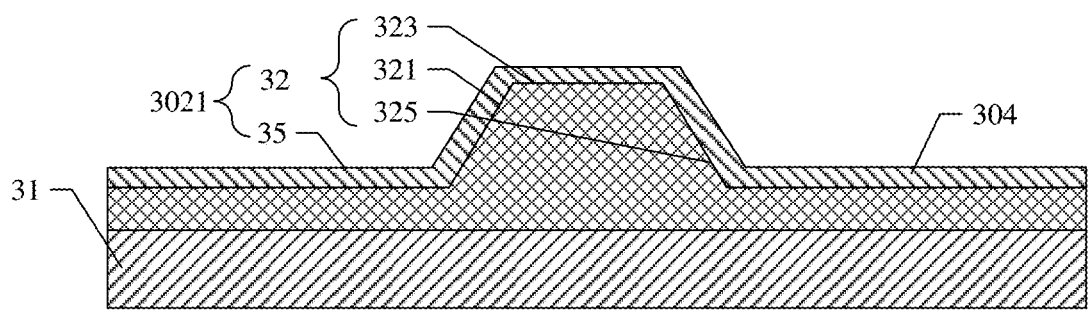
FIG. 12d is a schematic diagram of a structure obtained in step 1051 in FIG. 12c.

Step 1051: Form a prefabricated cladding layer on the ridge waveguide. Refer to FIG. 12d. A prefabricated cladding layer 304 is formed on the ridge waveguide 3021. In this implementation, the prefabricated cladding layer 304 may be deposited and formed on the ridge waveguide 3041 based on a chemical vapor deposition (CVD for short) technology, an atomic layer deposition (ALD for short) technology, or the like. The prefabricated cladding layer 304 covers a side that is of the ridge waveguide 3021 and that faces away from the insulating substrate 31, that is, the prefabricated cladding layer 304 covers a side that is of the waveguide plate layer and that faces away from the insulating substrate 31, and the first side wall 321, the top wall 323, and the second side wall 325 that are of the waveguide core 32. In this implementation, the prefabricated cladding layer 304 is a silicon layer.

Figure 12E:
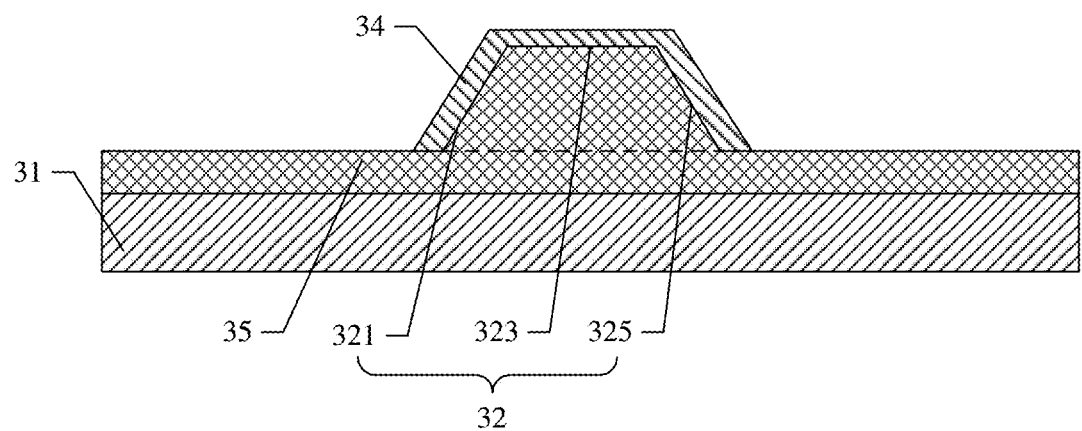
FIG. 12e is a schematic diagram of a structure obtained in step 1053 in FIG. 12c.

Step 1053: Remove the prefabricated cladding layer part to form the cladding layer. Refer to FIG. 12e. The cladding layer 34 covers the first side wall 321, the top wall 323, and the second side wall 325. In this implementation, the removing the prefabricated cladding layer part to form the cladding layer includes: etching the prefabricated cladding layer to form the cladding layer, where the etching includes an etching technology such as photoetching.

It may be understood that the cladding layer 34 may coat at least one of the first side wall 321, the top wall 323, and the second side wall 325. A structure of the waveguide core 32 is not limited, and the cladding layer 34 covers at least a part of the waveguide core 32. A part that is of the waveguide plate layer 35 and that is close to the waveguide core 32 is covered by the cladding layer 34.

Figure 12F:
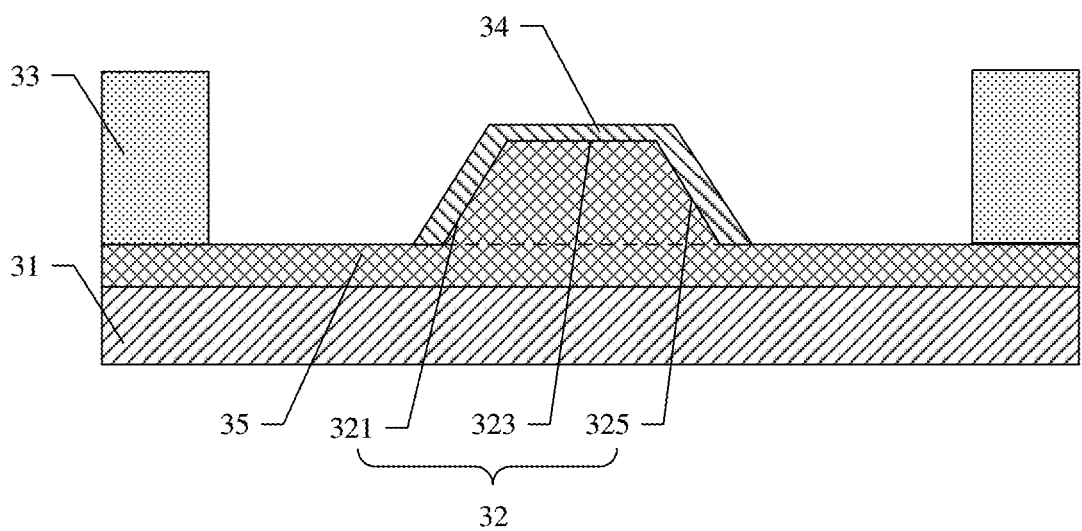
FIG. 12f is a schematic diagram of a structure obtained in step 107 in FIG. 11.

Step 107: Form at least two electrodes, where the at least two electrodes are distributed on two sides of the waveguide core. Refer to FIG. 12f. Two electrodes 33 are disposed on the waveguide plate layer 35. The two electrodes 33 are used to apply a voltage to the waveguide core 32 to form an electric field to change a refractive index of the waveguide core 32, to modulate a phase of an optical signal transmitted in the waveguide core 32. The electrodes 33 may be prepared and formed based on a process such as photoetching, metal sputtering, and metal stripping. A material of the electrodes may include gold, copper, aluminum, and the like.

It may be understood that, in step 103, only the waveguide core 32 may be formed on the insulating substrate 31.

It may be understood that the forming the coating structure on the at least a part of the outer wall of the waveguide core in step 105 includes: step 1051, that is, forming a prefabricated coating structure on the ridge waveguide, where the prefabricated coating structure includes a prefabricated cladding layer and a prefabricated additional layer, the prefabricated additional layer is disposed between the waveguide core and the prefabricated additional layer, and a refractive index of the prefabricated cladding layer is greater than a refractive index of the prefabricated additional layer; and step 1053: removing the prefabricated cladding layer part to form the cladding layer, and removing the prefabricated additional layer part to form the prefabricated additional layer.

The preparation method for the optical waveguide component may further include: step 109: depositing an insulation coverage layer. Refer to FIG. 3. An insulation coverage layer 36 covers the cladding layer 34, and a refractive index of the insulation coverage layer 36 is less than a refractive index of silicon and a refractive index of the waveguide core 32. Before step 107, that is, before the forming at least two electrodes, the preparation method further includes: depositing and forming at least two conductive transition units on a side that is of the waveguide plate layer and that faces away from the insulating substrate, the at least two conductive transition units are distributed on the two sides of the waveguide core, each conductive transition unit is sandwiched between one electrode and the waveguide plate layer, and a minimum spacing between the conductive transition unit and the waveguide core is less than a minimum spacing between the electrode and the waveguide core. A material of the conductive transition unit may include a material having a low optical loss and high conductivity, for example, a transparent conductive oxide or doped silicon. One or more of the following steps may be used in a process of forming the conductive transition unit: chemical vapor deposition, atomic layer deposition, ion implantation, photoetching, etching, stripping, and the like. This is not limited herein.

Before the depositing and forming at least two conductive transition units on a side that is of the waveguide plate layer and that faces away from the insulating substrate, the preparation method further includes: depositing and forming at least two insulation units on the side that is of the waveguide plate layer and that faces away from the insulating substrate; and the depositing and forming the at least two conductive transition units on the side that is of the waveguide plate layer and that faces away from the insulating substrate includes: depositing and forming the conductive transition unit on each insulation unit, and each insulation unit is sandwiched between one conductive transition unit and the waveguide plate layer. A material of the insulation unit may be silicon dioxide. A deposition method may be chemical vapor deposition or atomic layer deposition.

Before the forming at least two electrodes, the preparation method further includes: depositing and forming at least two insulation units on a side that is of the waveguide plate layer and that faces away from the insulating substrate, the at least two insulation units are distributed on the two sides of the waveguide core, and each insulation unit is sandwiched between the waveguide plate layer and one electrode. A material of the insulation unit may be silicon dioxide. A deposition method may be chemical vapor deposition or atomic layer deposition.

It may be understood that steps of the preparation method may be added or deleted according to actual preparation.

According to the optical waveguide component and the preparation method for the optical waveguide component provided in the first implementation of this disclosure, a new hybrid waveguide structure is used. The at least a part of the outer wall of the waveguide core is covered with the cladding layer, and the cladding layer can enhance a limitation on an optical field in the waveguide, thereby facilitating implementation of an efficient and high-bandwidth modulator. Under some design conditions, adding of the cladding layer can reduce a $V_xL$ value of an electro-optic modulator by at least 30%. The waveguide core may use an electro-optic material having linear electro-optic effect, for example, lithium niobate, barium titanate, or lead zirconium titanate. Therefore, an insertion loss can be reduced, and stability can be improved. However, in the conventional technology, an electro-optic polymer with a high optical loss and low stability is required for implementation. In addition, this embodiment may be implemented based on a common integrated electro-optic modulator preparation process, and no special process step is required, such as slit filling and material polarization. Therefore, the preparation process is simple.

Figure 13:
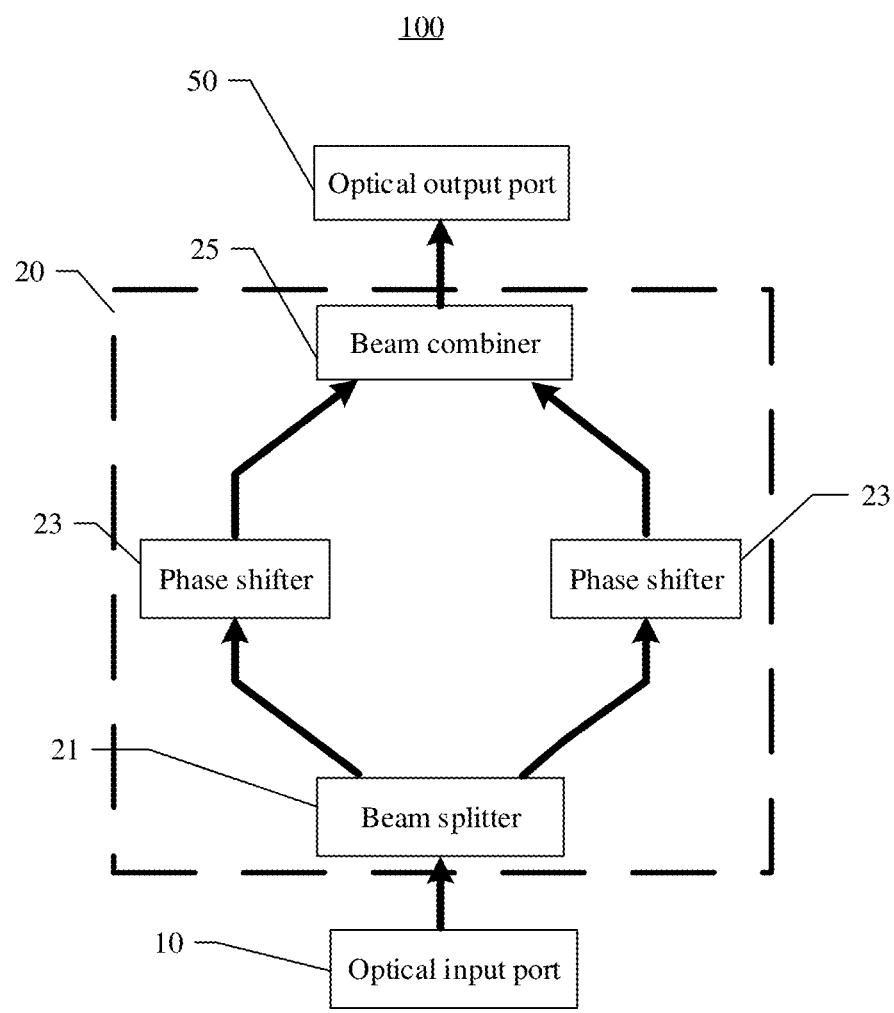
FIG. 13 is a schematic diagram of a structure of an electro-optic modulator according to a second implementation of this disclosure.

Refer to FIG. 13. FIG. 13 shows the electro-optic modulator 100 according to the second implementation of this disclosure, including an optical input port 10, an optical output port 50, and an interferometer 20. In this implementation, the interferometer 20 is a Mach-Zehnder (MZ for short) interferometer, that is, the electro-optic modulator 100 is an electro-optic modulator based on the MZ interferometer. The interferometer 20 includes a beam splitter 21, at least one phase shifter 23 (two phase shifters are shown in FIG. 13 as an example), and a beam combiner 25. At least one of the at least one phase shifter 23 is the optical waveguide component 30 provided in the first implementation. Each phase shifter 23 may be considered as an arm of the interferometer 20. An optical signal that is input through the optical input port 10 enters the beam splitter 21, an optical signal that is obtained by the beam splitter 21 through beam splitting is output to the phase shifter 23, an optical signal that is obtained by the phase shifter 23 through phase modulation enters the beam combiner 25, and an optical signal that is obtained by the beam combiner 25 through beam combination is output through the optical output port 50. In this implementation, the beam splitter 21 is a 1×2 beam splitter, and the beam combiner 25 is a 2×1 beam combiner. It may be understood that the beam splitter 21 is not limited to the 1×2 beam splitter, and the beam combiner 25 is not limited to the 2×1 beam combiner. Adjustment may be performed based on a quantity of arms of the interferometer 20.

More specifically, the optical signal enters the beam splitter 21 through the optical input port 10, and the optical signal is split by the beam splitter 21 into two parts, which are respectively directed to two arms of the interferometer 20. For ease of description, the phase shifter 23 that uses the optical waveguide component 30 is referred to as an adjustment phase shifter. Electrodes in the adjustment phase shifter are used to apply a voltage to a waveguide of the adjustment phase shifter based on an electrical signal input by a transmit controller to generate an electric field to change the refractive index of the waveguide core 32 in the optical waveguide component 30, to modulate a phase of the optical signal of the adjustment phase shifter. Optical signals of the two arms of the interferometer 20 are combined by the beam combiner 25, and the two optical signals interfere with each other, so that a feature of a combined optical signal changes compared with that of the optical signal input through the optical input port 10, and a feature of a changed optical signal may be reflected in light intensity, a light phase, or the like. An optical signal obtained through modulation is output through the optical output port.

Figure 14:
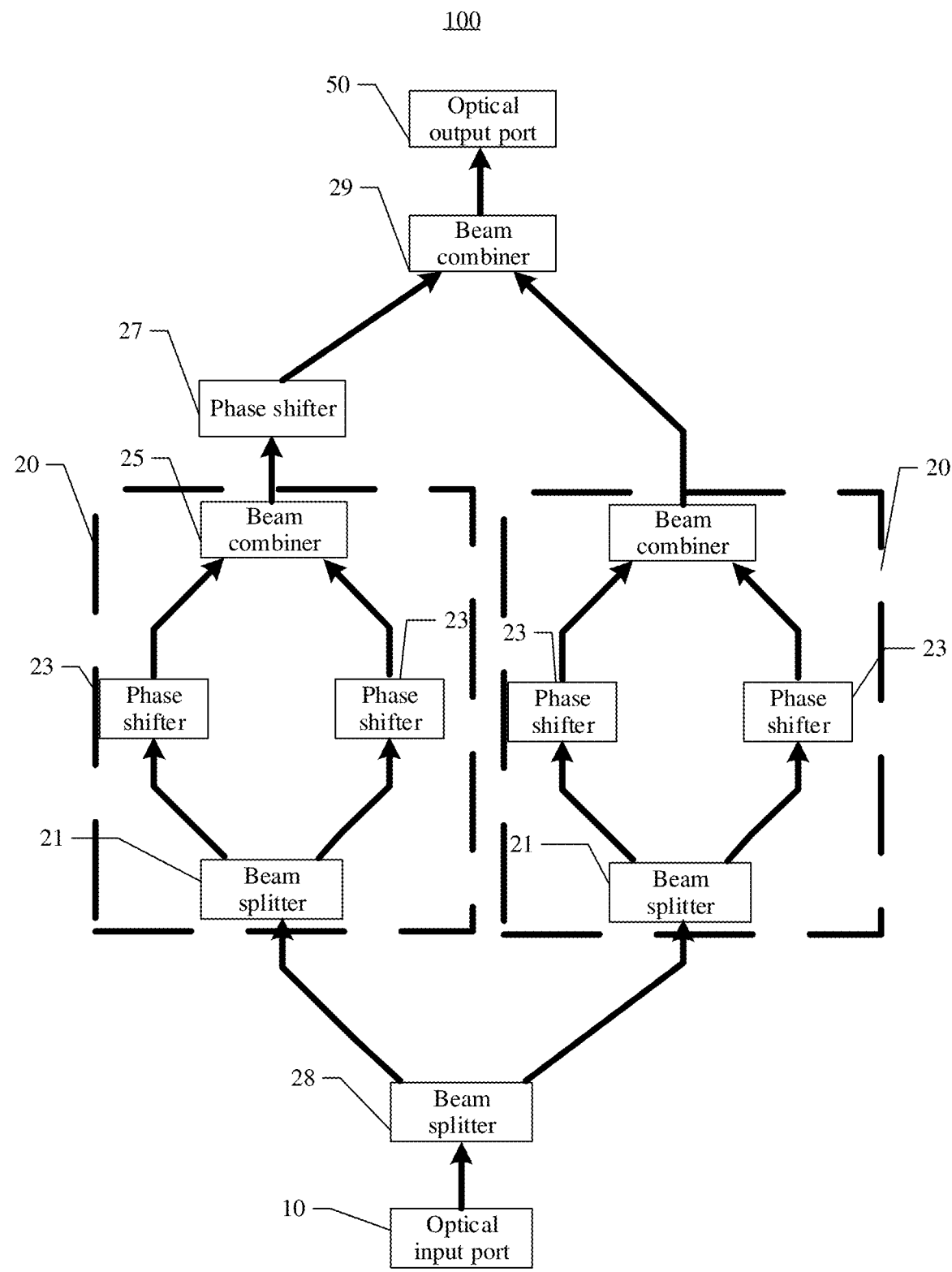
FIG. 14 is a schematic diagram of a structure of an electro-optic modulator according to a third implementation of this disclosure.

Refer to FIG. 14. The electro-optic modulator 100 provided in the third implementation of this disclosure is a single-polarized inphase/quadrature (IQ for short) modulator, and includes two connected interferometers 20, to implement a higher modulation rate. In this implementation, each interferometer 20 includes a beam splitter 21, two phase shifters 23, and a beam combiner 25. At least one of the two phase shifters 23 in the at least one interferometer 20 is the optical waveguide component 30 provided in the first implementation. An optical signal that is input through the optical input port 10 enters the beam splitter 21 in the interferometer 20, optical signals that are obtained by the beam splitter 21 through beam splitting are respectively input to the two phase shifters 23, an optical signal that is obtained by the phase shifter 23 through phase modulation enters the beam combiner 25 in the interferometer 20, and an optical signal is obtained by the beam combiner 25 through beam combination is output through the optical output port 50.

In this implementation, input ports of the beam splitters 21 of the two interferometers are connected to the optical input port 10 by using one beam splitter 28, and output ports of the two interferometers 20 are connected to the optical output port 50 by using one beam combiner 29. A phase shifter 27 is further connected between an output port of one interferometer 20 and the beam combiner 25 connected to the optical output port 50. An optical signal that is input through the optical input port 10 enters the interferometer 20 by using the beam splitter 28. The beam splitter 21 in the interferometer 20 splits the optical signal. After an optical signal is obtained by the phase shifter 23 in the interferometer 20 through phase modulation, the optical signal is processed by the beam combiner 25 in the interferometer 20 through beam combination, and finally arrives at the beam combiner 29 connected to the optical output port 50. The phase shifter 27 connected to one interferometer 20 is configured to adjust relative phases of the two interferometers 20 to required positions. It may be understood that the phase shifter 27 may be disposed between an input port of the beam splitter 21 of the interferometer 20 and an output port of the beam splitter 28 connected to the optical input port 10. Each interferometer 20 may be configured to be connected to one phase shifter 27. The phase shifter 27 may be omitted. In some implementations, the two interferometers 20 may share at least one electrode.

It may be understood that there may be a plurality of interferometers 20, and the plurality of interferometers 20 may be connected to form a single-polarized or dual-polarized IQ modulator, to implement a higher modulation rate.

It may be understood that there may be one or more phase shifters 23 in the interferometer 20.

Figure 15:
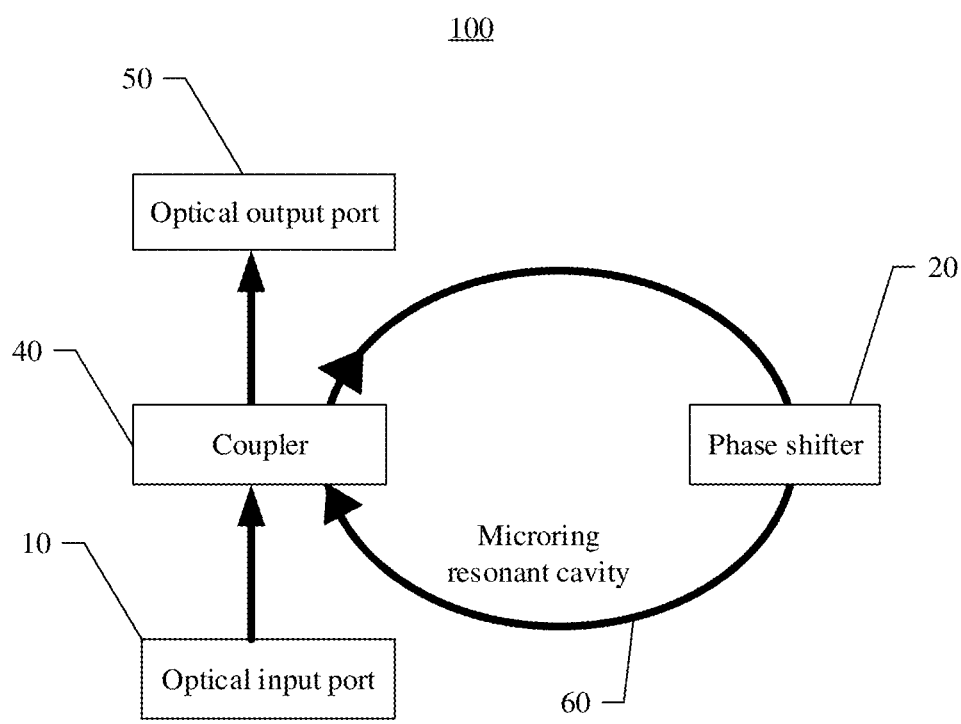
FIG. 15 is a schematic diagram of a structure of an electro-optic modulator according to a fourth implementation of this disclosure.

Refer to FIG. 15. The electro-optic modulator 100 provided in the fourth implementation of this disclosure has a microring resonant cavity structure. The electro-optic modulator 100 includes an optical input port 10, an optical output port 50, a coupler 40, and a microring resonant cavity 60. The microring resonant cavity 60 includes a phase shifter 20, and the phase shifter 20 is the optical waveguide component 30 provided in the first implementation. In other words, the optical waveguide component 30 provided in the first implementation is used as the phase shifter 20 in the microring resonant cavity 60, and is configured to change a phase of an optical signal transmitted in the microring resonant cavity 60, to change strength or a phase of an optical signal output through the optical output port 50. At least a part of an optical signal that is incident through the optical input port 10 is coupled to the microring resonant cavity 60 by using the coupler 40, and an optical signal that is obtained by the microring resonant cavity 60 through phase modulation is then coupled to the optical output port 50 by using the coupler 40 for output. In this implementation, there is one coupler 40, that is, the optical input port 10 and the optical output port 50 share a same coupler 40.

In some implementations, there may be at least two couplers 40. For example, the coupler 40 includes a first coupler and a second coupler. At least a part of an optical signal that is incident through the optical input port 10 is coupled to the microring resonant cavity 60 by using the first coupler, and an optical signal that is obtained by the microring resonant cavity 60 through phase modulation is coupled to the optical output port 50 by using the second coupler for output.

In some implementations, some waveguides of the microring resonant cavity 60 are not bent. For example, some waveguides of the microring resonant cavity 60 may be straight waveguides, to form a runway-shaped resonant cavity.

In some implementations, at least two parts on the microring resonant cavity 60 may be the optical waveguide component 30 provided in the first implementation, to be modulated by different electrical signals.

In some implementations, a hybrid waveguide in the optical waveguide component used as the phase shifter 20 and remaining waveguides of the optical input port 10, the optical output port 50, the coupler 40, and the microring resonant cavity 60 may be located at different layers. For example, the remaining waveguides of the optical input port 10, the optical output port 50, the coupler 40, and the microring resonant cavity 60 jointly form a first layer, the hybrid waveguide in the optical waveguide component is used as a second layer, and the first layer and the second layer are stacked in a first direction. The hybrid waveguide, of the phase shifter 20, at the second layer and the waveguides at the first layer are coupled in the first direction by using an evanescent wave to transmit the optical signal. Therefore, an electro-optic modulator of a hybrid integrated structure can be formed, and compatibility with different material platforms is improved.

Figure 16:
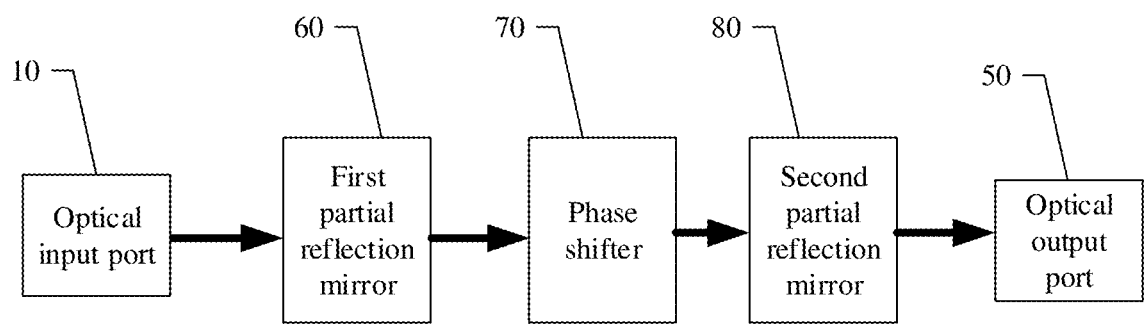
FIG. 16 is a schematic diagram of a structure of an electro-optic modulator according to a fifth implementation of this disclosure.

Refer to FIG. 16. The electro-optic modulator 100 provided in the fifth implementation of this disclosure has a Fabry-Perot (FP for short) resonant cavity structure, that is, the electro-optic modulator is an FP resonant cavity modulator. The electro-optic modulator 100 includes an optical input port 10, an optical output port 50, a first partial reflection mirror 60, a phase shifter 70, and a second partial reflection mirror 80. The phase shifter 70 includes the optical waveguide component provided in the first implementation, and an optical signal that is incident through the optical input port 10 is incident to the phase shifter 70 by using the first partial reflection mirror 60. After being phase modulated by the phase shifter 70, the optical signal is incident to the second partial reflection mirror 80, a part of the optical signal that is incident to the second partial reflection mirror 80 is output by the optical output port 50 and the other part of the optical signal that is incident to the second partial reflection mirror 80 is reflected into the phase shifter 70, and after being phase modulated by the phase shifter 70, the other part of the optical signal is incident to the first partial reflection mirror 60, and then a part of the other part of the optical signal that is incident to the first partial reflection mirror 60 is reflected to the phase shifter 70. In this way, the first partial reflection mirror 60 and the second partial reflection mirror 80 form a resonant cavity, and therefore the optical signal can be propagated back and forth between the first partial reflection mirror 60 and the second partial reflection mirror 80. A structure (the first partial reflection mirror 60 and the second partial reflection mirror 80) for implementing a partial reflection function may be a waveguide Bragg grating structure that has a periodic structure change or a periodic refractive index change in a waveguide direction.

Electrodes on two transverse sides of the phase shifter 70 are used to apply a voltage to a hybrid waveguide at a position based on an electrical signal input by a transmit controller (not shown in the figure) to generate an electric field, to change an effective refractive index of the hybrid waveguide herein, change a resonance wavelength of an FP resonant cavity, and further change a feature of an output optical signal.

In some implementations, the electro-optic modulator 100 has at least two or more areas. For example, the optical waveguide component is used as the phase shifter 70 in at least two parts between the first partial reflection mirror 60 and the second partial reflection mirror 80, to be modulated by different electrical signals.

In some implementations, the hybrid waveguide in the phase shifter 70, the first partial reflection mirror 60, and the second partial reflection mirror 80 are located at different layers. For example, the optical input port 10, the optical output port 50, the first partial reflection mirror 60, and the second partial reflection mirror 80 jointly form a first layer, the hybrid waveguide in the optical waveguide component is used as a second layer, and the first layer and the second layer are stacked in a first direction. The hybrid waveguide, of the phase shifter, at the second layer and waveguides at the first layer are coupled in the first direction by using an evanescent wave to transmit the optical signal.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An optical waveguide component comprising:
an insulating substrate,
a waveguide core,
at least two electrodes, and
a cladding layer, wherein
the at least two electrodes and the waveguide core are all disposed on the insulating substrate, the at least two electrodes are positioned on two opposing sides of the waveguide core, and the cladding layer covers at least a part of an outer wall of the waveguide core;
the waveguide core comprises an electro-optic material having an electro-optic effect;
a refractive index of the insulating substrate is less than a refractive index of the waveguide core; and
the optical waveguide component further comprises an additional layer disposed between the cladding layer and the waveguide core, and a refractive index of the cladding layer is greater than a refractive index of the additional layer, and
the cladding layer includes at least one cladding layer, the additional layer includes at least one additional layer, and the at least one cladding layer and the at least one additional layer are alternately disposed.

2. The optical waveguide component according to claim 1, wherein the waveguide core comprises a first side wall, a top wall, and a second side wall that are connected, the top wall is disposed opposite to the insulating substrate, the first side wall and the second side wall are both located between the top wall and the insulating substrate, and the cladding layer covers at least one of the first side wall, the top wall, or the second side wall.

3. The optical waveguide component according to claim 1 wherein the optical waveguide component further comprises a waveguide plate layer, the waveguide plate layer is laid on the insulating substrate, the waveguide core and the at least two electrodes are disposed on the waveguide plate layer, and the waveguide core and the waveguide plate layer jointly form a ridge waveguide.

4. The optical waveguide component according to claim 3, wherein a part that is of the waveguide plate layer is covered by the cladding layer.

5. The optical waveguide component according to claim 3, wherein the optical waveguide component further comprises at least two conductive transition units, the at least two conductive transition units are positioned on the two opposing sides of the waveguide core, and each of the at least two conductive transition units is sandwiched between one of the at least two electrodes and the waveguide plate layer, respectively.

6. The optical waveguide component according to claim 5, wherein the optical waveguide component further comprises at least two insulation units, the at least two insulation units are positioned on the two opposing sides of the waveguide core, each of the at least two insulation units is respectively sandwiched between the waveguide plate layer and one of the at least two conductive transition units, and a minimum spacing between one of the at least two conductive transition units and the waveguide core is less than a minimum spacing between one of the at least two electrodes and the waveguide core.

7. The optical waveguide component according to claim 3, wherein the optical waveguide component further comprises at least two insulation units, the at least two insulation units are positioned on the two opposing sides of the waveguide core, and each of the at least two insulation units is sandwiched between the waveguide plate layer and one of the at least two electrodes, respectively.

8. The optical waveguide component according to claim 1, wherein the optical waveguide component further comprises at least two conductive transition units, the at least two conductive transition units are positioned on the two opposing sides of the waveguide core, each of the at least two conductive transition units is respectively sandwiched between one of the at least two electrodes and the insulating substrate, and a minimum spacing between the one of the of the at least two conductive transition units and the waveguide core is less than a minimum spacing between the one of the at least two electrodes and the waveguide core.

9. A preparation method for an optical waveguide component comprising:
  providing a prefabricated structure, wherein the prefabricated structure comprises an insulating substrate and a prefabricated layer that are stacked, the prefabricated layer comprises an electro-optic material having an electro-optic effect, and a refractive index of the insulating substrate is less than a refractive index of the prefabricated layer;
  etching the prefabricated layer of the prefabricated structure to form a waveguide core;
  forming a cladding layer or a coating structure on at least a part of an outer wall of the waveguide core, wherein:
    the coating structure is formed on at least a part of the outer wall of the waveguide core, the coating structure comprises the cladding layer and an additional layer, the additional layer is disposed between the cladding layer and the waveguide core, and a refractive index of the cladding layer is greater than a refractive index of the additional layer; and
    the cladding layer includes at least one cladding layer, the additional layer includes at least one additional layer, and the at least one additional layer and the at least one cladding layer are alternately disposed; and
  forming at least two electrodes, wherein the at least two electrodes are positioned on two opposing sides of the waveguide core.

10. The preparation method according to claim 9, wherein the etching of the prefabricated layer to form the waveguide core further comprises: etching the prefabricated layer to further form a waveguide plate layer, the waveguide core is disposed on the waveguide plate layer, and the waveguide core and the waveguide plate layer jointly form a ridge waveguide.

11. The preparation method according to claim 10, wherein before the forming of the at least two electrodes, the preparation method further comprises: depositing and forming at least two conductive transition units on a side that is of the waveguide plate layer and that faces away from the insulating substrate, the at least two conductive transition units are positioned on the two opposing sides of the waveguide core, each of the at least two conductive transition units is respectively sandwiched between one of the at least two electrodes and the waveguide plate layer, and a minimum spacing between one of the at least two conductive transition units and the waveguide core is less than a minimum spacing between one of the at least two the electrodes and the waveguide core.

12. The preparation method according to claim 11, wherein before the depositing and forming of the at least two conductive transition units on a side that is of the waveguide plate layer and that faces away from the insulating substrate, the preparation method further comprises: depositing and forming at least two insulation units on the side that is of the waveguide plate layer and that faces away from the insulating substrate; and
  the depositing and forming of the at least two conductive transition units on a side that is of the waveguide plate layer and that faces away from the insulating substrate comprises: depositing and forming each of the at least two conductive transition units on each of the at least two insulation units, respectively, and each of the at least two insulation units is respectively sandwiched between one of the at least two conductive transition units and the waveguide plate layer, and a minimum spacing between one of the at least two conductive transition units and the waveguide core is less than a minimum spacing between one of the at least two electrodes and the waveguide core.

13. The preparation method according to claim 10, wherein before the forming of the at least two electrodes, the preparation method further comprises: depositing and forming at least two insulation units on a side that is of the waveguide plate layer and that faces away from the insulating substrate, the at least two insulation units are positioned on the two opposing sides of the waveguide core, and each of the at least two insulation units is respectively sandwiched between the waveguide plate layer and one of the at least two electrodes.

14. The preparation method according to claim 9, wherein before the forming of the at least two electrodes, the preparation method further comprises: depositing and forming at least two conductive transition units on a side of the insulating substrate, the at least two conductive transition units are positioned on the two opposing sides of the waveguide core, each of the at least two conductive transition units is respectively sandwiched between one of the at least two electrodes and the insulating substrate, and a minimum spacing between one of the at least two conductive transition units and the waveguide core is less than a minimum spacing between one of the at least two electrodes and the waveguide core.

15. An electro-optic modulator comprising:
  an optical input port,
  an optical output port, and
  an optical waveguide component comprising:
    an insulating substrate,
    a waveguide core,
    at least two electrodes, and
    a cladding layer, wherein
  the at least two electrodes and the waveguide core are all disposed on the insulating substrate, the at least two electrodes are positioned on two opposing sides of the waveguide core, and the cladding layer covers at least a part of an outer wall of the waveguide core;
  the waveguide core comprises an electro-optic material having an electro-optic effect;
  a refractive index of the insulating substrate is less than a refractive index of the waveguide core;
  the optical waveguide component further comprises an additional layer disposed between the cladding layer and the waveguide core, and a refractive index of the cladding layer is greater than a refractive index of the additional layer;
  the cladding layer includes at least one cladding layer, the additional layer includes at least one additional layer, and the at least one cladding layer and the at least one additional layer are alternately disposed; and wherein the optical input port is configured to input an optical signal, the at least two electrodes of the optical waveguide component are configured to generate an electric field to change a refractive index of the waveguide core, to modulate a phase of an optical signal incident to the waveguide core, and the optical output port is configured to output an optical signal obtained by the optical waveguide component through modulation.

16. The electro-optic modulator according to claim 15, wherein the electro-optic modulator further comprises at least one interferometer comprising:
   a beam splitter,
   at least one phase shifter, and
   a beam combiner,
   at least one of the at least one phase shifter is the optical waveguide component, the optical signal that is input through the optical input port enters the beam splitter, an optical signal that is obtained by the beam splitter through beam splitting enters the phase shifter, an optical signal that is obtained by the phase shifter through phase modulation enters the beam combiner, and an optical signal that is obtained by the beam combiner through beam combination is output through the optical output port.

17. The electro-optic modulator according to claim 15, wherein the electro-optic modulator further comprises:
   at least one coupler and
   a microring resonant cavity, the microring resonant cavity comprises the optical waveguide component, at least a part of the optical signal that is incident through the optical input port is coupled to the microring resonant cavity by using the at least one coupler, and an optical signal that is obtained by the microring resonant cavity through phase modulation is coupled to the optical output port by using the at least one coupler for output.

18. The electro-optic modulator according to claim 15, wherein the electro-optic modulator is an FP resonant cavity modulator, the electro-optic modulator further comprises:
   a first partial reflection mirror,
   a phase shifter, and
   a second partial reflection mirror, and
   the phase shifter comprises the optical waveguide component, the optical signal that is incident through the optical input port is incident to the phase shifter by using the first partial reflection mirror and is then incident to the second partial reflection mirror after phase modulation by the phase shifter,
   a part of the optical signal that is incident to the second partial reflection mirror is output through the optical output port and the other part of the optical signal that is incident to the second partial reflection mirror is reflected to the phase shifter, and
   the first partial reflection mirror and the second partial reflection mirror form a resonant cavity, so that the optical signal can be propagated back and forth between the first partial reflection mirror and the second partial reflection mirror.

19. The optical waveguide component according to claim 1, wherein:
   the additional layer is closer to the waveguide core than the cladding layer; and
   the cladding layer and the additional layer cover a first side wall, a top wall, and a second side wall of the waveguide core.

20. The optical waveguide component according to claim 1, wherein
   the cladding layer and the additional layer are distributed on a first side wall and a second side wall of the waveguide core, but the cladding layer and the additional layer do not cover at least a portion of a top wall of the waveguide core.

* * * * *